(12) United States Patent
Pauley et al.

(10) Patent No.: US 9,015,985 B2
(45) Date of Patent: Apr. 28, 2015

(54) FISHING SINKER

(76) Inventors: Dwight James Pauley, Morgantown, WV (US); Brook James Pauley, Morgantown, WV (US); Susan Louise Pauley, Morgantown, WV (US)

(*) Notice: Subject to any disclaimer, the term of this patent is extended or adjusted under 35 U.S.C. 154(b) by 269 days.

(21) Appl. No.: 12/858,516

(22) Filed: Aug. 18, 2010

(65) Prior Publication Data

US 2011/0041380 A1   Feb. 24, 2011

Related U.S. Application Data

(60) Provisional application No. 61/234,804, filed on Aug. 18, 2009.

(51) Int. Cl.
*A01K 95/00* (2006.01)

(52) U.S. Cl.
CPC ................... *A01K 95/005* (2013.01)

(58) Field of Classification Search
CPC .......................................... A01K 95/00
USPC ............... 43/44.97, 44.96, 43.1, 43.12, 44.87
IPC ....................................... A01K 95/00
See application file for complete search history.

(56) References Cited

U.S. PATENT DOCUMENTS

| | | | |
|---|---|---|---|
| 1,074,673 A | 10/1913 | Weiss | |
| 1,564,147 A * | 12/1925 | Stickley et al. | 43/43.12 |
| 1,993,114 A | 3/1935 | Rasmussen | |
| 2,308,238 A | 1/1943 | Baker | |
| 2,392,335 A * | 1/1946 | Morrill | 43/43.12 |
| 2,570,293 A | 10/1951 | Vadnais | |
| 2,687,592 A | 8/1954 | Purcell | |
| 2,754,614 A | 7/1956 | Yakel | |
| 2,796,693 A | 6/1957 | Gunterman | |
| 3,077,694 A | 2/1963 | Cox | |
| 3,081,574 A | 3/1963 | Wise | |
| 3,273,278 A | 9/1966 | Lynch | |
| 3,393,467 A | 7/1968 | Potter et al. | |
| 3,415,005 A | 12/1968 | Gilham | |
| 3,782,025 A * | 1/1974 | Kochevar | 43/44.9 |
| 3,942,281 A | 3/1976 | Hill | |
| 3,982,350 A | 9/1976 | Heckathorn | |

(Continued)

FOREIGN PATENT DOCUMENTS

| | | | | |
|---|---|---|---|---|
| EP | 1599091 B1 | 5/2008 | | |
| JP | 11089493 A * | 4/1999 | | A01K 95/00 |

(Continued)

OTHER PUBLICATIONS

Cravotta et al., LImestone drains to increase pH and remove dissolved metals from acidic mine drainage, Dec. 22, 1997, Pergamon, Applied Geochemistry 14 (1999) pp. 581-909.*

*Primary Examiner* — Darren W Ark
*Assistant Examiner* — Timothy Schwarz
(74) *Attorney, Agent, or Firm* — Robert P. Lenart, Esq.; Pietragallo Gordon Alfano Bosick & Raspanti, LLP

(57) ABSTRACT

A fishing sinker includes a tumbled limestone body and an element for attaching the limestone body to a fishing line. The element for attaching the limestone body to a fishing line can include: a break-away swivel fastener including a stem in a cavity of the limestone body, an eyelet, and a swivel body coupling the stem to the eyelet, an eyelet including a loop portion and a twisted portion, or a tongue and groove fastener.

14 Claims, 39 Drawing Sheets

(56) References Cited

U.S. PATENT DOCUMENTS

| | | |
|---|---|---|
| 4,286,403 A | 9/1981 | Rogers |
| 4,389,805 A | 6/1983 | Hargrave |
| D282,956 S | 3/1986 | Duffey |
| 4,638,587 A | 1/1987 | Koch |
| 4,663,881 A | 5/1987 | Follett |
| 4,828,829 A * | 5/1989 | Bethshears .................... 424/84 |
| 4,837,968 A | 6/1989 | Lin |
| 4,883,620 A | 11/1989 | Follett |
| 4,910,908 A | 3/1990 | Rosenburg |
| 4,926,580 A | 5/1990 | Lin |
| 5,243,779 A | 9/1993 | Reed |
| 5,715,627 A | 2/1998 | Jones |
| 5,784,825 A | 7/1998 | Ross |
| 6,076,297 A | 6/2000 | Lippincott |
| 6,497,069 B1 | 12/2002 | Acworth et al. |
| 2006/0070291 A1 | 4/2006 | Pomeroy |
| 2007/0163165 A1* | 7/2007 | Castro et al. .................. 43/42.06 |

FOREIGN PATENT DOCUMENTS

| | | | | |
|---|---|---|---|---|
| KR | 2004-108872 | * | 12/2004 | ............ A01K 95/00 |
| RS | WO 2009/084972 A1 | * | 7/2009 | |
| WO | WO0149109 A1 | | 7/2001 | |
| WO | WO2004071187 A1 | | 8/2004 | |
| WO | WO 2009084972 A1 | * | 7/2009 | ............ A01K 95/00 |

* cited by examiner

FIG. 16.1
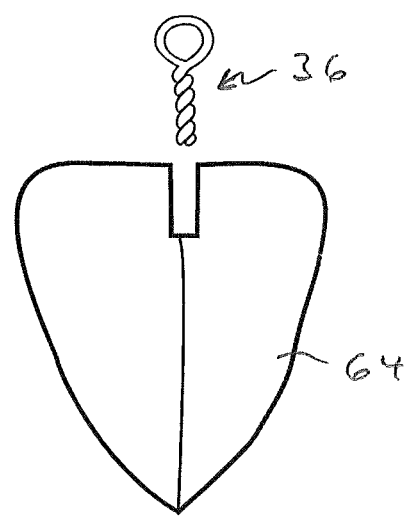

FIG. 16.2
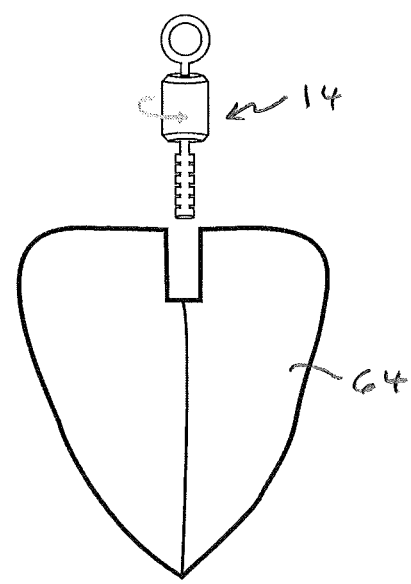

FIG. 17.1
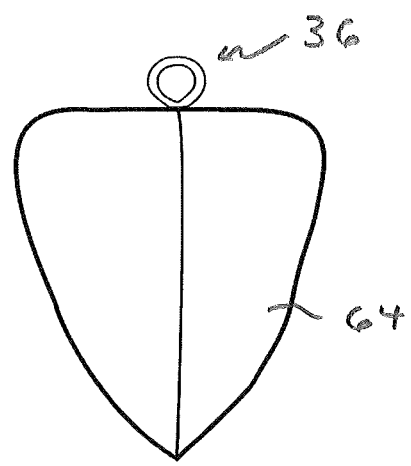

FIG. 17.2
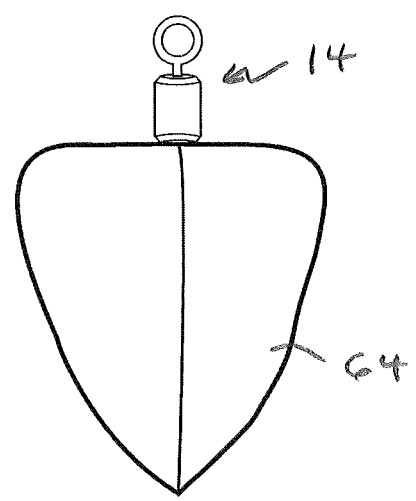

FISHING SINKER

CROSS-REFERENCE TO A RELATED APPLICATION

This application claims the benefit of U.S. Provisional Patent Application Ser. No. 61/234,804, filed Aug. 18, 2009 and titled "Fishing Sinker" which is hereby incorporated by reference.

FIELD OF THE INVENTION

This invention relates to fishing sinkers and more particularly to environmentally safe sinkers.

BACKGROUND OF THE INVENTION

Fishing sinkers that are environmentally friendly are being favored by anglers around the world. Fishing sinkers are known to get snagged and lost in waterways. It has been estimated that approximately 3,000 tons of lead sinkers are lost in waterways throughout the United States and Canada annually. In the United States, New Hampshire and Vermont have banned the use of certain lead sinkers, and New York and Maine have banned the sale of certain lead sinkers. Lead sinkers have been linked to waterfowl mortality in several coastal states. For example, Loons will swallow food and then consume small pebbles to aid in food digestion. Loons also mistakenly consume lead sinkers which cause a quick death. In certain areas, a majority of loon deaths are the direct result of lead poisoning. Alternatives to lead sinkers are available, such as: tin, tungsten, steel, bismuth, plastic, pewter, etc. However, these alternatives are not natural and may pose threats of pollution if used in abundance. They also provide no benefits to waterways with low pH and alkalinity levels.

Limestone aids in the purification of streams that are affected by acid mine drainage. Specifically designed limestone channels are constructed on mine reclamation sites in order to raise pH levels and produce alkalinity in waterways. This helps restore and maintain a pure and balanced ecosystem in waterways that are affected by acid runoff produced by mines.

There is a need for an environmentally safe fishing sinker that can benefit waterways with low pH and alkalinity levels.

SUMMARY OF THE INVENTION

A fishing sinker includes a body constructed of an environmentally safe material and means for attaching the body to a fishing line. The means of attachment can include a specific break-away swivel, eyelet, drop shot swivel, or tongue and groove fastener.

BRIEF DESCRIPTION OF THE DRAWINGS

FIG. 16.1 illustrates the insertion of an eyelet into a top balanced limestone sinker body.

FIG. 16.2 illustrates the insertion of a swivel stem into a top balanced limestone sinker body.

FIG. 17.1 illustrates an eyelet embedded into a top balanced limestone sinker body.

FIG. 17.2 illustrates a swivel stem embedded into a top balanced limestone sinker body.

DETAILED DESCRIPTION OF THE INVENTION

Figure 1:
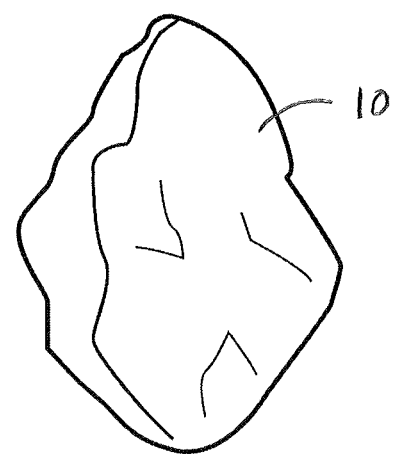
FIG. 1 is a schematic representation of an unprocessed limestone.

In one embodiment, the present invention uses a limestone that is bored and/or cut from the earth. The limestone is subjected to processing in which the shape, size, texture, weight, and sometimes smell are altered. Through the processing, the limestone maintains its chemical properties, which enable the benefits it provides for waterways with low pH and alkalinity.

The sinker includes a means for attaching the sinker body to a fishing line. In various examples, the attaching means can comprise a non-lead break-away swivel, eyelet, drop shot swivel, or tongue and groove fastener that can be embedded in the limestone sinker at a specific mark. The break-away swivel, eyelet, drop shot swivel and tongue and groove fastener are specifically manufactured in order to fit uniformly into the limestone sinker. The break-away swivel, eyelet, drop shot swivel, or tongue and groove fastener can be positioned to provide maximum performance according to the shape and size of the sinker. The non-lead break-away swivel or eyelet can be used to attach the sinker directly to a fishing line by using a fisherman's line loop, which prevents knotting the line, or the sinker can be attached to a snap that is tied directly on the fishing line. The drop shot swivel can be used to attach the sinker by a simple means of pulling the tag end of the fishing line into the clip of the drop shot swivel. The tongue and groove fastener can be used to attach the sinker to the fishing line by a simple means of opening and closing the fastener to pinch the line.

In another embodiment, bored pass-through holes can be provided to accommodate a fishing line. These holes can be positioned to provide maximum performance.

Sinkers constructed in accordance with the present invention allow anglers to fish without posing an environmental threat to humans, wildlife, aquatic life, or ecosystems. The limestone sinker exhibits chemical properties that have the ability to improve water quality in waterways where pH and alkalinity levels are low. The various embodiments enable anglers to fish while getting fewer snags and losing fewer sinkers. This means the loss of fewer "lead" hooks, spinners, lures, etc., which directly contributes to less contamination in waterways. The limestone sinker provides an uninhibited natural movement to lures, flies, spinners, jigs, baits, etc. By uninhibited, this means there is no effort given by the angler to provide movement to the lure, fly, jig, spinner, bait, etc. In addition, since no two limestone sinkers are identical in shape, size, texture, or appearance, the angler can choose a desired sinker for the particular waterway and environmental conditions.

The present invention provides an efficient means for anglers to take an active role in bettering waterways with low pH and alkalinity. The present invention also provides anglers with a way to fish without contributing to pollution affecting humans, the environment, wildlife, aquatic life and waterway ecosystems.

Processing of the limestone gives it the ability to not snag as easily as other sinkers on the market and allows it to be dislodged from protrusions in waterways easier than other sinkers on the market. Sinkers constructed in accordance with the invention provide uninhibited natural movement to lures, flies, jigs, spinners, baits, etc., because they do not sink as rapidly as other sinkers on the market. The invention also gives anglers a choice of the sinker they choose because no two are identical in shape, texture, or appearance.

In one embodiment, the present invention provides a fishing sinker that is made of natural limestone specifically cut and/or bored from the earth. The cut limestone is processed in a manner that maintains the chemical properties that are useful in waterways with low pH and alkalinity levels. The limestone undergoes a change wherein the limestone's natural appearance, shape, size (weight), and texture change significantly. An optional unique odor may be added as a fish attractant, if preferred by the angler.

In one example, the limestone sinker comprises of a non-lead eyelet or break-away swivel that is secured into a preferred mark of the limestone sinker. The eyelets, break-away swivels, drop shot swivels, and tongue and groove fasteners are specifically manufactured and altered to fit uniformly into the limestone sinker. The position of the non-lead eyelet or break-away swivel placed in the limestone sinker is selected to allow the sinker to perform at its optimal ability. The eyelet or break-away swivel is used as a means to easily attach the limestone sinker to the fishing line. The break-away swivel or eyelet may be attached directly to the line which provides an easy and efficient way for the angler to change the sinker's position on the fishing line. The eyelet or break-away swivel may also be attached using a snap, where the snap is tied directly onto the fishing line and the sinker is then attached to the snap. This would help the angler to keep the sinker at a preferred stationary mark on the fishing line.

In another embodiment, the invention provides an in-line sinker. In-line limestone fishing sinkers are longer cylindrical limestone sinkers that have either two non-lead eyelets or break-away swivels positioned at the farthest or extreme ends of the sinker (e.g., tip end to tip end). This allows the angler to attach the sinker directly to a fishing line and maintain an in-line vertical direction with the fishing line. This can reduce or eliminate some twisting and provides for a straighter means of casting.

In another embodiment, the limestone sinker may be attached to a fishing line by the use of a drop shot swivel. The drop shot swivel is designed specifically for the limestone sinker. The body's specific size and unique stem design permits it to fit uniformly within the limestone sinker and securely adhere to glue in a cavity in the sinker body. The drop shot swivel is easily attached to a fishing line by pulling the tag end or tip of the fishing line into the clip of the drop shot swivel where it is tightly held in place. The clip of the drop shot is equipped with small cutters that are used to slice the fishing line under tension in a sinker snag situation. Therefore, the only material lost in the waterway would be the limestone fishing sinker along with its benefits, and not the other tackle, such as hooks, spinners, etc. which could be potential pollutants.

In another embodiment, the limestone sinker may be attached to a fishing line by the use of a tongue and groove fastener. The tongue and groove fastener is designed explicitly for the limestone sinker. The body's specific size and unique stem design permits it to fit uniformly within the limestone sinker and securely adhere to the glue. The tongue and groove fastener is easily attached to a fishing line by opening and closing the fastener. The fishing line is held in place when pinched between the tongue and groove of the fastener. This tongue and groove design holds the sinker stationary on the desired mark of the fishing line.

One benefit of this invention is that it is environmentally safe for humans, aquatic life, wildlife, and surrounding waterway ecosystems. The invention poses no threat to the lives of humans (especially pregnant women and children), aquatic life, wildlife, and the environment; such as lead sinkers do and other chemically composed metal or plastic sinkers might.

The sinkers of this invention are not ordinary natural stone sinkers. The limestone is processed to a unique shape, size, appearance, and proper texture providing for the absorption of the attractant ingredient, if desired. The proper texture also prevents an armoring effect, which would reduce the limestone sinker's ability to raise pH levels and produce alkalinity in waterways. This processing produces a limestone sinker that differs from limestone found in the natural environment.

The sinkers of this invention have the ability to raise pH levels and produce alkalinity in waterways. An example of waterways with low pH and alkalinity levels include waterways that are/or have been polluted by acid mine drainage.

One or two non-leaded break-away swivels or eyelets can be embedded into the limestone sinker on a mark which provides optimal performance. The break-away swivels and eyelets are specifically altered and manufactured to fit uniformly into the limestone sinkers. A drop shot swivel can be embedded into the limestone sinker on a mark which provides optimal performance. The drop shot swivel is specifically designed for exclusive use with the limestone sinker. The drop shot swivel's unique design provides for quick and easy attachment of a limestone sinker to a fishing line without the need for tying knots or forming loops. Alternatively, one or two tongue and groove fasteners can be embedded into the limestone sinker on a mark or marks which provide optimal performance. The tongue and groove fastener is specifically designed and manufactured for exclusive use with the limestone sinker. The tongue and groove fastener's unique design provides for quick and easy attachment of a limestone sinker to a fishing line without the need for tying knots or forming loops. Another attachment alternative for the limestone sinker consists of one or two bored holes drilled through the limestone sinker at explicit marks, to serve as line passageways. The break-away swivel, eyelet, drop shot swivel, tongue and groove fastener, or bored hole serves as an efficient means for attaching the sinker onto a fishing line.

The sinker is shaped in such a manner that it is harder to snag and easier to get unattached when snagged by protrusions in waterways. No two of these sinkers are exactly alike in shape, size, and appearance. This provides a means for the angler to select each limestone sinker as he/she would select a fly, lure, jig, spinner, bait, etc. Limestone sinkers may be selected according to the conditions of the waterway, weather and ecosystem environment. The selection depends on which limestone sinker will perform best according to the conditions.

In another aspect, the altered shape, size, and texture of the sinker allows it to sink less rapidly than other sinkers on the market. The fact that it sinks less rapidly is because it is less dense. This unique ability permits the angler to fish the bottom of the waterway and contact fewer snags. This characteristic provides a natural appearance and uninhibited natural movement for lures, flies, jigs, spinners, baits, etc. Uninhibited natural movement in this context means that there is no effort given by the angler to provide for movement for the lure, fly, jig, spinner, bait, etc. This unique ability enables it to perform very well for drift fishing maneuvers.

In another aspect, the processed limestone has no odor. Most other sinkers on the market possess an odor, depending on the material they're composed of, which may deter fish from bait. The fact that the limestone sinker has no odor gives it a more natural pretense in waterways, which is less likely to daunt fish.

Limestone Processing

In one example, the process uses size #67 limestone, which ranges from ½" to ¾" diameter, and a Model 65T, 65 lb. 110 volt; ⅓ HP motor Diamond Pacific Rotary Tumbler. Limestone sizes that are larger or smaller than size #67 may be used, but all scales, measures, weights, and classifications must be changed accordingly. Varying the size of the limestone does not alter the intended fundamental nature of the present invention.

The sinkers can be made out of specifically cut and bored limestone to categorize as size #67. The #67 limestone is washed in a chute type of apparatus, using water, until dust is washed clear of the limestone (e.g., until no gray water is seen dispersing from the limestone). FIG. 1 is a schematic representation of an unprocessed limestone 10.

Then, the limestone is processed by tumbling. The preferred tumbler used in this production is a Model 65T, 65 lb. rotary tumbler manufactured by Diamond Pacific. All weights and measurements used in the following description relate to the 65 lb. rotary tumbler and size #67 limestone.

Initially, 50 lbs. of limestone is measured and loaded into the rotary tumbler barrel. This should fill the tumbler barrel approximately ⅔ full with limestone rocks. Fifty pounds of #67 limestone is equivalent to about 4 gallons (or 12.5 lbs. per gallon). There can be approximately 5,200 sinkers in one tumbler.

Silicon Carbide (120/220 Coarse Grit Mix) is added to the tumbler. The ratio used for silicon carbide grit in one example is 1 lb. of silicon carbide 120/220 grit for every 10 lbs. of #67 washed limestone. In one example, 5 lbs. of Silicon Carbide 120/220 coarse grade grit is added to the 50 lbs. of washed limestone in the tumbler barrel.

Water is added to the tumbler barrel, so that water barely covers the top layer of the rocks. In one example, this is approximately 1½ gallons to 2 gallons or 10-16 lbs. of water.

In one example, the process requires 4-7 days of tumbling (approximately 96-168 hours). It is important not to over tumble the limestone because it may result in an armoring effect, which reduces its ability to raise pH levels and produce alkalinity.

The tumbler is stopped periodically once a day where the lid of the tumbler barrel is removed. The lid is removed to prevent gas build up from within the tumbler barrel.

Upon completion of the last day of tumbling, the limestone sinkers are then washed with water, in a washing chute apparatus, until the silicon carbide 120/220 grit mix is removed from the limestone sinkers.

Figure 2:
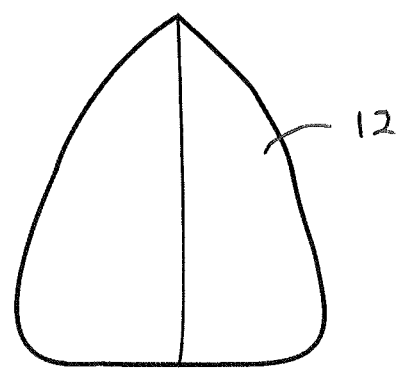
FIG. 2 is a schematic representation of a tumbled limestone.

The limestone sinkers are then sorted into two separate classes. A ½" size separating screen is used to differentiate the separate classes of sinkers. All limestone sinkers that are smaller than ½" in size are classified as Class I sinkers and weigh approximately 0.001-0.2 ounces. All limestone sinkers that are ½" or larger in size are classified as Class II sinkers and weigh approximately 0.2-0.5 ounces. This provides for an easy way for anglers to distinguish the size and weight of the sinker. FIG. 2 is a schematic representation of a tumbled limestone 12.

Break-Away Swivel Manufacturing for Class II Sinkers

Figure 3:
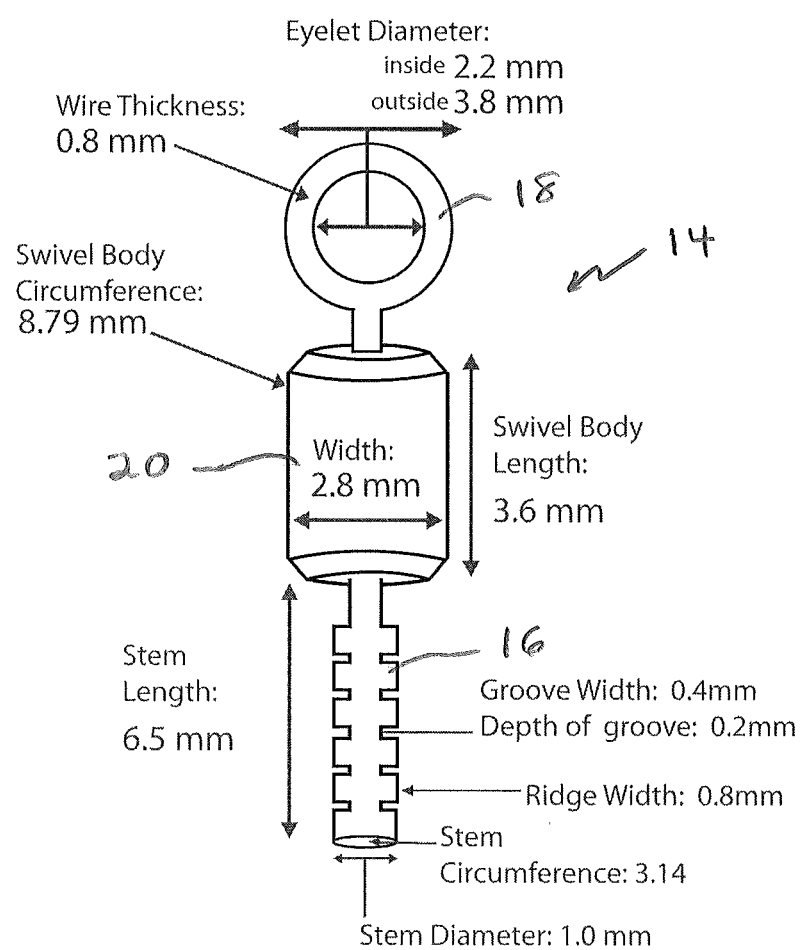
FIG. 3 illustrates a non-lead rugged stem swivel for a limestone sinker body.

In one embodiment, a lead-free swivel with a break-away point is used in the limestone sinker. FIG. 3 is an illustration of a non-lead rugged stem swivel fastener 14 for a limestone sinker. The swivel fastener includes a stem 16 for insertion into a cavity in the tumbled limestone body, an eyelet 18, and a swivel body 20 that couples the eyelet to the stem. The break-away swivel is specifically designed and constructed to be used explicitly with the limestone sinker. These particular swivels are not found anywhere on the market. In one embodiment, the swivels are made of a stainless steel lead-free material which prevents corrosion. They include a swivel body, an eyelet on one end of the swivel body and a uniformed grooved stem on the opposite end of the swivel body. The specifically designed grooved stem allows the swivel to optimally adhere to glue in a cavity in the sinker body and fit securely within a drilled sinker hole.

In order to prevent the sinker body from sliding involuntarily when attached to a fishing line with the Fishermen's Loop, in one example, the inside diameter of the eyelet is 2.2 mm. The thickness of the wire used for the eye is 0.65 mm. For the swivel body to fit securely on the top of the limestone sinker body, the diameter of the swivel body is 2.8 mm. The diameter of the stem is 1.0 mm which permits it to fit securely and with slight resistance into a 1/16" and/or 5/64" drilled hole. The rugged stem of the swivel is shaped generally in the form of a cylinder, has a circular cross-section, and includes five grooves and six circumferential ridges that have abrasive edges; this allows the glue to adhere uniformly with optimal strength around the stem. The ridges have a width of 0.8 mm. The grooves are cut to a depth of 0.2 mm and are spaced at 0.4 mm in order for the glue to properly encompass the stem of the swivel. The dimensions of the grooves are chosen for the glue to hold the stem with maximum strength. To fit precisely into the drilled hole of the sinker body, the length of the stem is 6.5 mm. It is desirable for the swivel body to rest balanced and level on top of the limestone sinker body in order to maintain smooth rotation of the swivel.

Figure 4:
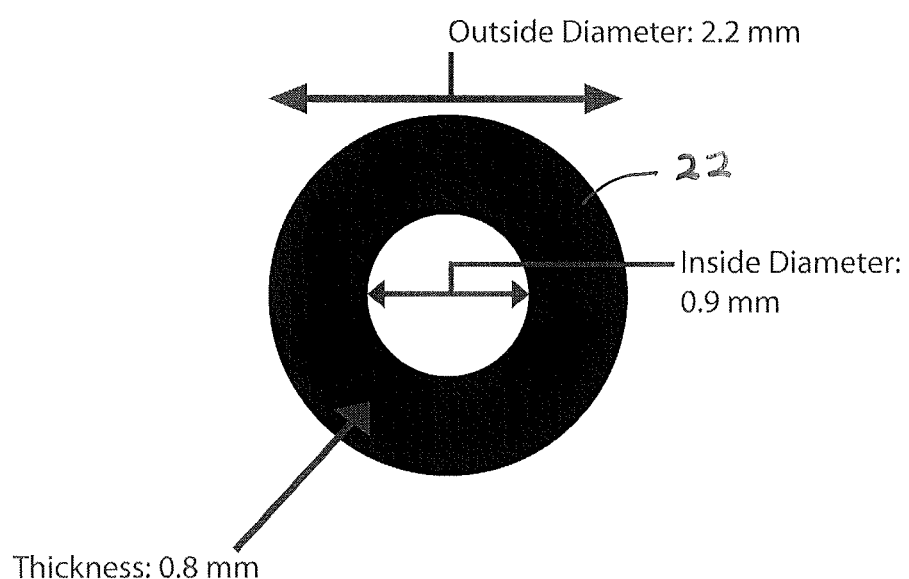
FIG. 4 illustrates a ring used to seal the bottom of a swivel body.
Figure 5:
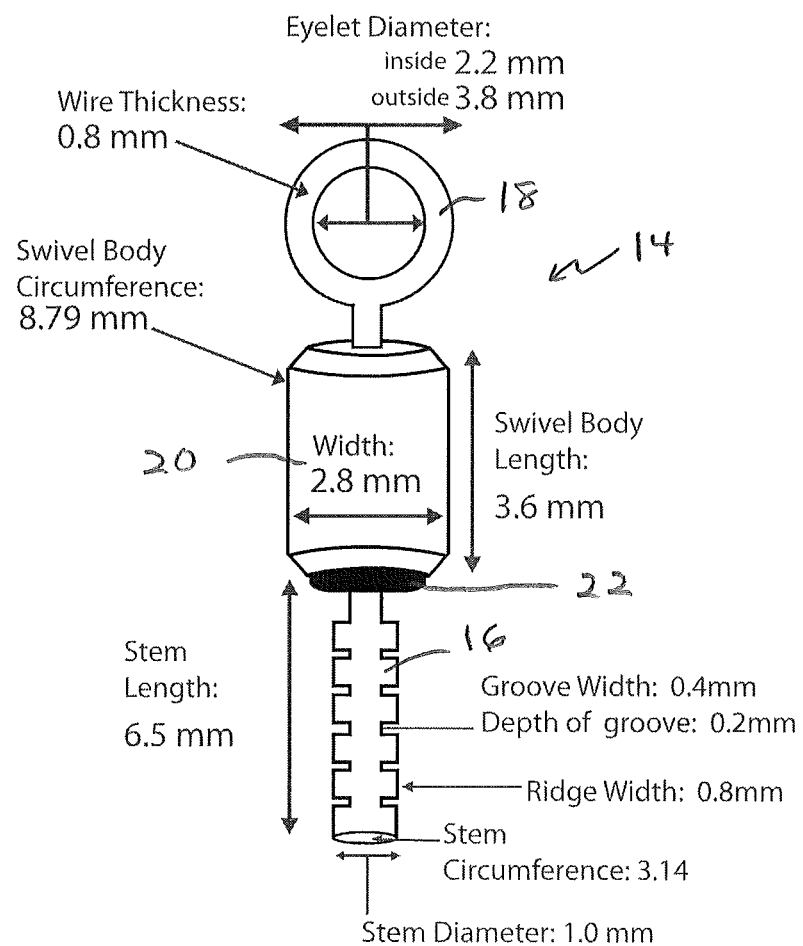
FIG. 5 illustrates a ring encompassing the rugged stem of a swivel.

An optional ring of resilient material such as rubber (shown as item 22 in FIG. 4) with an inside diameter of 0.9 mm, an outside diameter of 2.2 mm and a thickness of 0.8 mm is placed on the stem of the swivel tight and flat against the bottom of the swivel body. FIG. 5 illustrates how the resilient ring encompasses the stem of a swivel. It is important the ring be made to the described specifications in order for the swivel body to rest balanced and level on the surface of the sinker body. The main purpose of the ring is to prevent glue from seeping into the swivel body and causing interference with the proper rotation of the swivel. The ring also aids in the gluing process as an adjustment tool when adhering the swivel body to the sinker body.

The break-away swivel is specifically designed and constructed to be used explicitly with the limestone sinker; this particular swivel is not found anywhere on the market. The swivels are also designed to break away given a certain amount of pull strength from the fishing line. The break-away swivel is a great advantage to anglers. It permits anglers to save fishing line and expensive tackle, and only suffer the loss of the sinker in a sinker snag situation. More importantly, the break-away swivel offers real benefits to waterways and the environment. When a sinker is snagged, the angler can pull on the fishing line and depending upon the strength rating of the swivel that is attached to the sinker, the eyelet stem of the swivel will break or pull apart from the swivel body. Fewer snags directly contribute to less potentially lead contaminants being lost in the waterways which have a serious detrimental effect on aquatic life, wildlife, and ecosystems. This is a benefit to the waterway because only the limestone sinker and little material from the lead-free swivel are left behind.

The break-away swivels are rated according to break-away strength. The break-away strength refers to the pounds of pull strength (or test) it takes to pull the eyelet stem from the swivel body. Varying the pounds of pull strength (or test) of the break-away swivels does not alter the intended fundamental nature of the present invention. In various embodiments, the pull strength can range from about 4 pounds to about 300 pounds.

In one example, the swivel has an inside eyelet diameter size of 2.2 mm. The diameter of the stem is 1.0 mm. The length of the stem is approximately 6.5 mm. The pound of pull strength (or test) is rated for 77 pounds.

The break-away swivels are designed to be optimal in snag situations. They eliminate the stress of breaking lines and losing expensive lures, baits, hooks, jigs, flies, and tackle when a sinker is snagged. The break-away swivels also greatly minimize the amount of lead-free swivel material left in the waterway, as well as, potentially harmful contaminants, such as hooks, lures, spinners, etc. The break-away swivel design makes the limestone sinker a desirable fishing sinker for the environmentally conscious angler.

Drop Shot Swivel with Line Cutters and Clip Attachment

Figure 6:
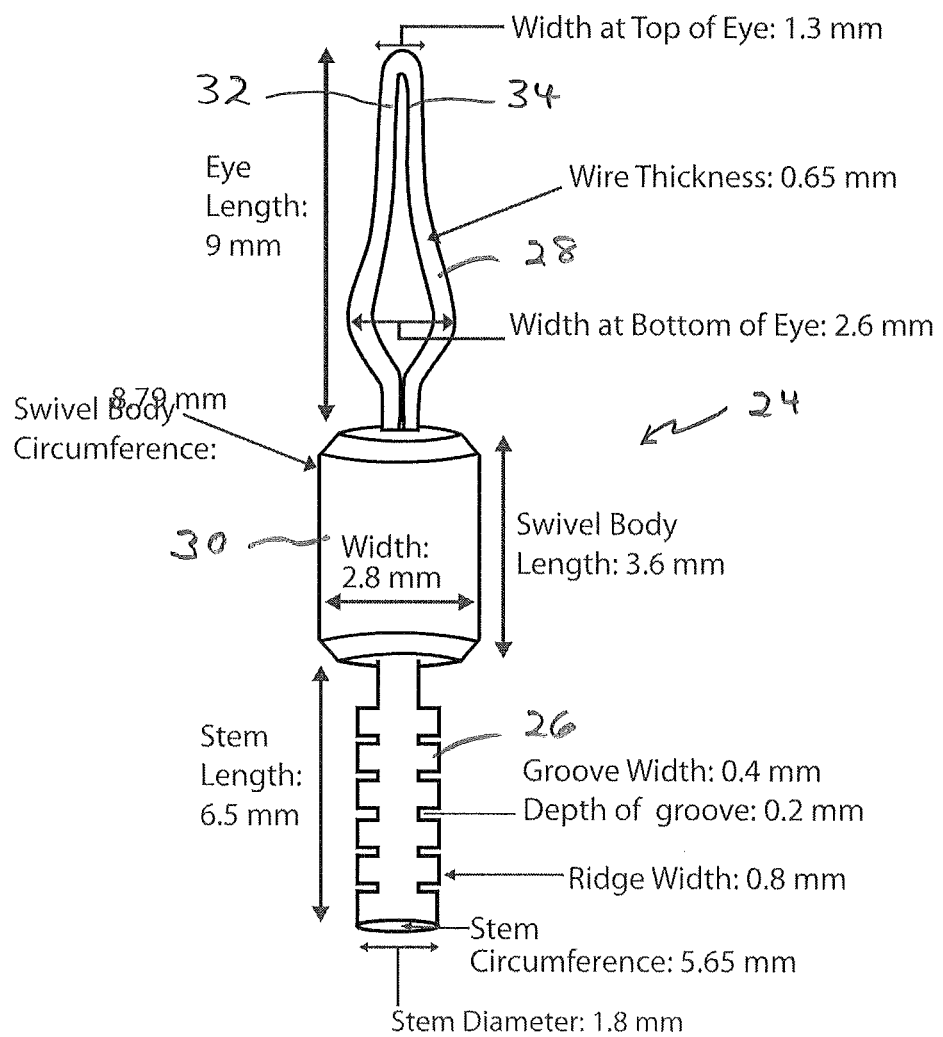
FIG. 6 illustrates a non-lead drop shot rugged stem design with line clip for a limestone sinker body.

In another embodiment shown in FIG. 6, a lead-free swivel fastener with a line clip attachment equipped with line cutters is used in the limestone sinker. The swivel fastener 24 includes a stem 26, and diamond shaped tapered eyelet 28 and a swivel body 30 coupling the eyelet to the stem. The stem is generally cylindrically shaped and includes circumferential ridges and grooves. This drop shot swivel is specifically designed and constructed to be used explicitly with the limestone sinker. These particular swivels are not found anywhere on the market. The drop shot swivel is typically used with a 1/8 ounce or larger sinker because the weight and size of the sinker body allow the swivel optimal performance. The swivel fasteners are made of stainless steel lead-free material which prevents corrosion. They include: a swivel body 30, a diamond shape eyelet with a line clip for attachment and line cutters, and a uniformly grooved stem on the opposite end of the swivel body. In order for the line clip to securely grip the tag end of a fishing line, the base of the eyelet has a diameter of 2.6 mm and the top of the eye has a diameter of 1.3 mm. The length of the eye is 9.0 mm and the thickness of the wire used for the eye is 0.65 mm. In order for the swivel body to fit securely on the top of the limestone sinker body, the swivel body has a diameter of 2.8 mm. The length of the swivel body is 3.6 mm. The diameter of the stem is 1.8 mm which permits it to fit securely and with slight resistance into a 5/64" drilled hole in the limestone body. In this embodiment, the rugged stem of the swivel includes five grooves and six ridges that have abrasive edges. This allows the glue in the cavity of the body to adhere uniformly with optimal strength around the stem. The ridges have a width of 0.8 mm and the grooves are cut 0.2 mm deep. The ridges are spaced at 0.4 mm in order for the glue to properly encompass the stem of the swivel. The dimensions of the groove are chosen in order for the glue to hold the stem with maximum strength. To fit precisely into the drilled hole of the sinker body, the maximum length of the stem is 6.5 mm. It is desirable for the swivel body to rest balanced and level on top of the limestone sinker body in order to maintain smooth rotation of the swivel.

Figure 7:
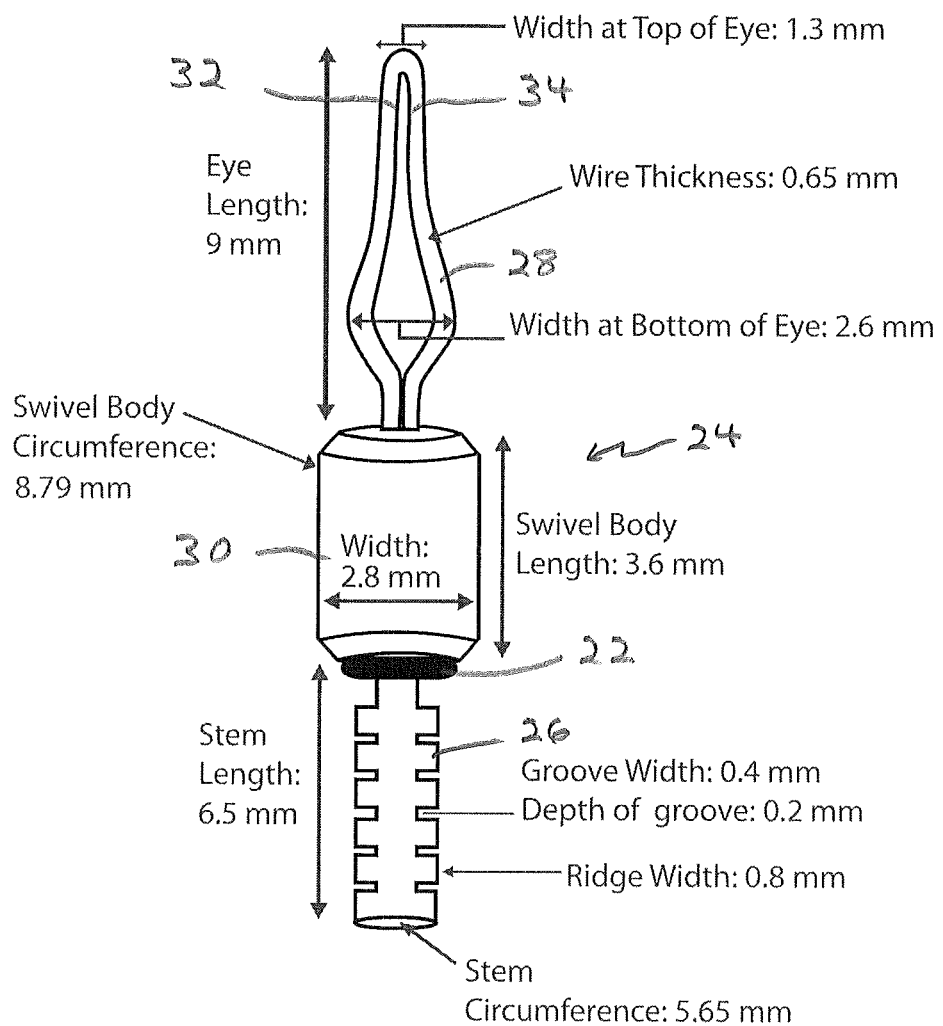
FIG. 7 illustrates a ring used to seal a drop shot swivel body.

An optional rubber ring, with an inside diameter of 0.9 mm, an outside diameter of 2.2 mm and a thickness of 0.8 mm can be placed on the stem of the swivel tight and flat against the bottom of the swivel body. FIGS. 4 and 7 illustrate the resilient ring and the placement of the ring encompassing the stem of a drop shot swivel. It is important the ring be made as described above in order for the swivel body to rest balanced and level on the surface of the sinker body. The ring also aids in the gluing process as an adjustment tool when adhering the swivel body to the sinker body. The drop shot swivel is specifically designed and constructed to be used explicitly with the limestone sinker; this particular swivel is not found anywhere on the market.

In one example, referred to as the Size 6 drop shot swivel, the eyelet has a top inside diameter of 1.3 mm, and a rugged stem 1.8 mm diameter and 6.5 mm in length. The specifically designed grooved stem allows the swivel to optimally adhere to the glue and fit securely within the drilled sinker hole. The method for attachment is unconventional, as the limestone fishing sinker is attached to the tag end or tip of a fishing line. Thus, the sinker is at the end of the fishing line and the hook is attached above the sinker. This sinker requires no loops or knots for attachment. The fishing line is fed through the large opening of the eye and pulled tight into the clip of the eyelet. The clip of the drop shot eye is equipped with small cutters 32 and 34 that are positioned on inside edges of an apex of the diamond shaped portion and are used to slice the fishing line when it's under increased tension in a sinker snag situation. The benefits of the drop shot swivel are that it is easily attached, easily removed and it cuts the line in a snag situation, and resists sinker slippage. In a snag situation, where the sinker is sure to be lost in a waterway, with the right amount of tension the line cutters will cut the fishing line. This important benefit saves the anglers' more expensive fishing tackle, such as the lure, bait, jig, spinner, fly, etc. Therefore, the only material left in the waterway would be the limestone fishing sinker along with its benefits, and not the other tackle which could be potential pollutants.

Eyelet Manufacturing

Figure 8:
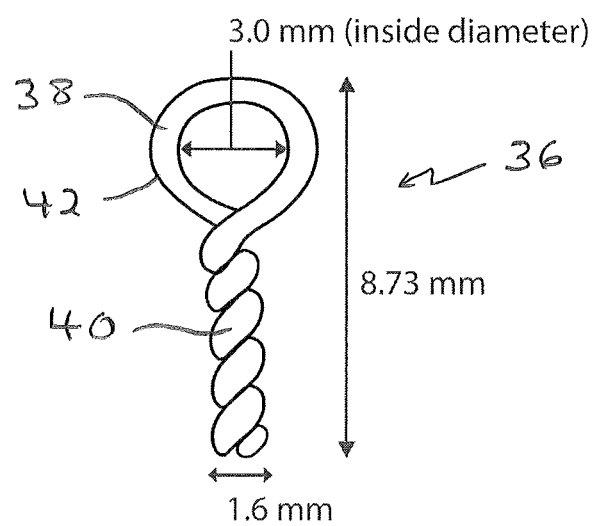
FIG. 8 illustrates a non-lead eyelet stem design for a limestone sinker body.

In another embodiment illustrated in FIG. 8, a stationary eyelet 36 used in the limestone sinker is specifically designed and manufactured for use with the limestone sinker. It is not found anywhere on the market. The eyelet includes a loop portion 38 connected to a twisted portion 40, and is manufactured of stainless steel, which prevents corrosion. The stainless steel may be coated with a dark colored non-lead coating such as a paint 42. The coating is used to reduce fishing line abrasion and the dark color offers a natural appearance to the sinker. The stainless steel eyelet stem is uniquely twisted to the right in order to provide optimal strength for the glue in a cavity of the sinker body to adhere to the stem. In one embodiment, the thickness of the wire is 0.8 mm. The outside diameter of the eye is 3.8 mm and the inside diameter is 2.2 mm. These dimensions prevent involuntarily slipping when the sinker is attached to a fishing line with the Fishermen's Loop. The eyelet size is 8.73 mm long with five twists to the right. The length of the eyelet is important in order for the eye to set level on top of the limestone sinker while at the same time allowing the bottom of the stem to make contact with the base of the drilled hole. The twists are to the right to create a drilling effect for precision and uniform adhesion of the glue when inserting the eyelet into the drilled hole. The diameter of the eyelet stem is 1.0 mm in order for it to fit tightly into a 1/16" drilled hole with some resistance.

Tongue and Groove Fastener Attachment

Figure 9:
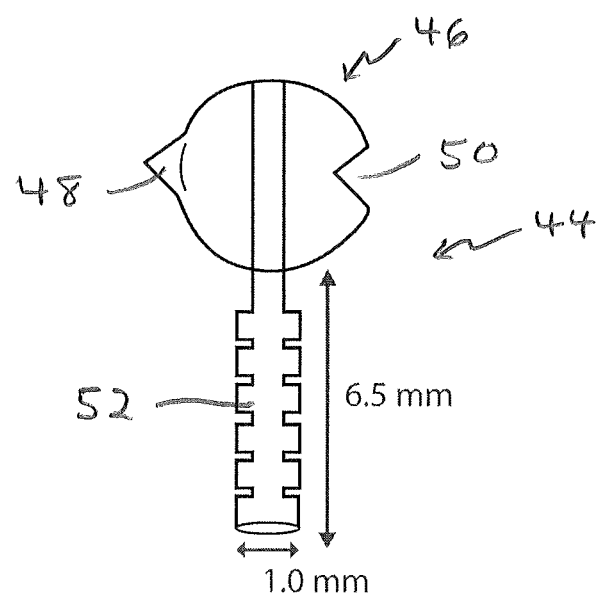
FIG. 9 illustrates an open tongue and groove fastener for a limestone sinker body.
Figure 10:
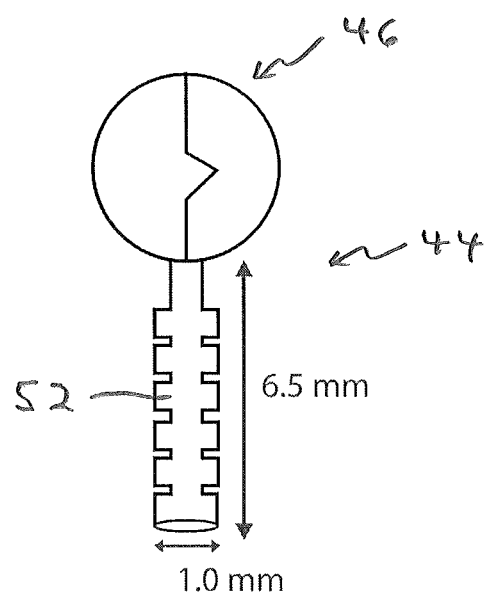
FIG. 10 illustrates a closed tongue and groove fastener for a limestone sinker body.

In another embodiment, the sinker uses a tongue and groove fastener for line attachment that is designed and manufactured for exclusive use with the limestone sinker. It requires no loops or knots for attachment. FIG. 9 is an illustration of an open tongue and groove fastener 44. The tongue and groove fastener includes a non-slip material clasp 46 with a tongue 48 and groove type notch 50 to hold the fishing line in place. The non-slip material reduces fishing line abrasion and the groove holds the fishing line in place. A grooved stem 52 having a generally cylindrically shaped portion with circumferential ridges and grooves is positioned at the bottom of the fastener to allow attachment to a limestone sinker. The grooved stem is fitted into the drilled hole in the limestone sinker and adhered in place with glue. The tongue and groove fastener is easily opened and attached to the fishing line on the desired mark. The benefits of the tongue and groove fastener are that it is easily attached, is easily removed, is easily adjusted, and resists sinker slippage. In a snag situation, where the sinker is sure to be lost in a waterway, with the right amount of tension the fastener will slip off the fishing line. This important benefit saves the anglers' more expensive fishing tackle, such as the lure, bait, jig, spinner, fly, etc. It also leaves only the limestone sinker in the waterway and not other pollutants such as the tackle and fishing line. In one embodiment, the diameter of the rugged stem is approximately 1.0 mm. The length of the rugged stem is approximately 6.5 mm. FIG. 10 is an illustration of a closed tongue and groove fastener.

Non-Lead Eyelet/Break-Away Swivel Placement for a Class I Sinker

Figure 11:
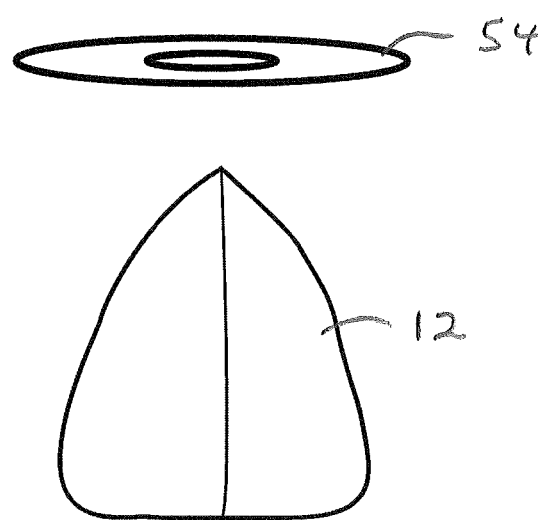
FIG. 11 illustrates a grinding process for a limestone sinker body.

In one example, Class I sinkers utilize a stationary eyelet. First, when necessary, the sinkers are ground on a drill mark with a semi-coarse grade rock grinder to create a small, smooth and level surface to allow for more efficient drilling. FIG. 11 illustrates a grinding process for a limestone sinker body wherein a grinding wheel 54 is used to grind a top of a tumbled limestone body 12.

Figure 12:
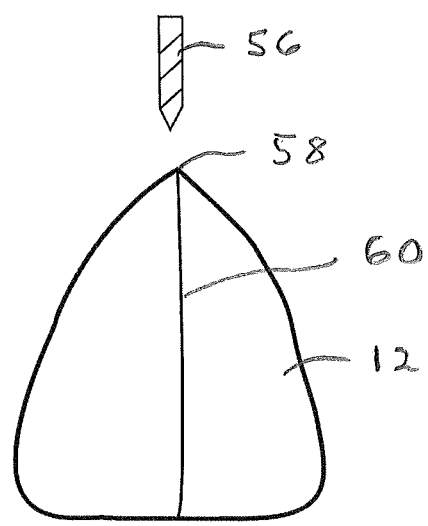
FIG. 12 illustrates a bottom balanced limestone sinker body.

Then, the Class I sinkers are drilled with a low speed, 620 RPM (or less) stationary drill press and carbide drill bit 56 as illustrated in FIG. 12 in order to prevent chipping and cracking of the sinker.

Figure 13:
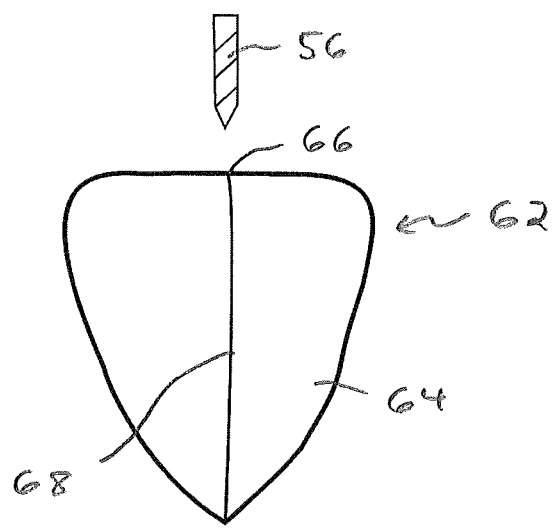
FIG. 13 illustrates a top balanced limestone sinker body.

The limestone sinkers are drilled on a mark 58 at an end of a line 60 that intersects the center of gravity of the limestone. This is a mark where optimum balanced sinking weight is centered toward the bottom of the sinker. FIG. 12 illustrates a bottom balanced sinker. Since no two sinkers are identical, there is a different drilling location mark on each limestone sinker. For a top balanced sinker, the broader, flatter and heavier top portion of the sinker is drilled. FIG. 13 illustrates a top balanced sinker 62 having a tumbled limestone body 64. A drilling location 66 is marked at an end of a line 68 that passes through the center of gravity of the sinker body. The result of this drilled sinker would place the optimum balanced sinking weight centered toward the top of the sinker. It is desirable to drill on the spot where the sinker will have the longest shape when the break-away swivel or eyelet is placed in the drilled hole.

Figure 14:
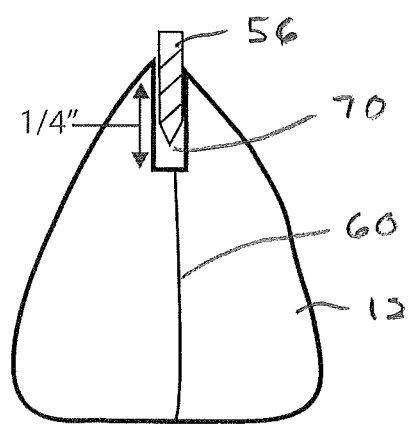
FIG. 14 illustrates a drilling process for a top balanced sinker body.

The Class I sinkers can be drilled with a 1/16" carbide drill bit to a depth of approximately 1/4". It is desirable to use a carbide drill bit on the limestone sinker body in order to prevent cracking of the limestone and to make precision holes to the exact diameter. It is equally desirable to leave 17/64" of the drill bit out of the drill chuck because if too little of the drill bit is exposed, then the drilled hole will not be deep enough for the swivel or eyelet to fit; or if too much is exposed, the drill bit will break during the drilling process. FIG. 14 illustrates a drilling process for a bottom balanced limestone sinker body 12 wherein the drill bit creates a cavity 70 in the sinker body. The cavity is sized to receive the stems of the fasteners.

When drilling the sinkers, it is desirable to hole the sinker bodies with rubber coated pliers, or grips to prevent the sinkers from being nicked or scratched. The sinkers are then cleaned of drilling dust by tapping, brushing, blowing, or rinsing with water. If rinsed with water, the sinker must be completely dry before gluing.

Figure 15:
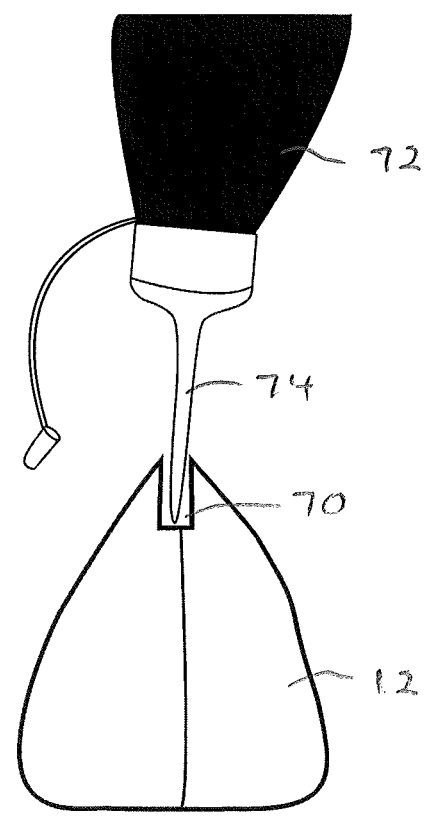
FIG. 15 illustrates the application of glue to a limestone sinker body.

The eyelet or break-away swivel is secured in the limestone using glue. The preferred glue is manufactured by Aron Alpha, Industrial Krazy Glue Products and is labeled Type 453TB. The glue can be used in a 50 gram bottle because of its convenience for application. It is desirable that an applicator tip be placed on the nozzle of the glue bottle to assist in inserting the glue into the very base of the drilled hole for maximum adhesion. FIG. 15 illustrates the application of glue from a bottle 72 with an applicator tip 74 to a cavity 70 in a limestone sinker body 12.

Figure 16:
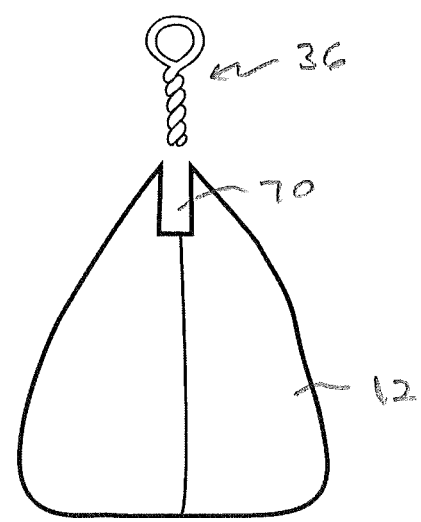
FIG. 16 illustrates the insertion of an eyelet into a limestone sinker body.

The eyelet or break-away swivel is then set as illustrated in FIGS. 16, 16.1 and 16.2. Glue can be inserted into the 1/16" drilled hole in the limestone sinker. Then the applicator tip is inserted to the bottom of the drilled hole. Next the hole is completely filled with glue while removing the applicator tip from the drilled hole. When pulling the applicator tip out of the hole, a circular motion is used to form a slightly raised round eye of glue on top of the drilled hole. This step is important to permit maximum adhering strength and glue coverage for the stem of the eyelet or swivel.

Figure 17:
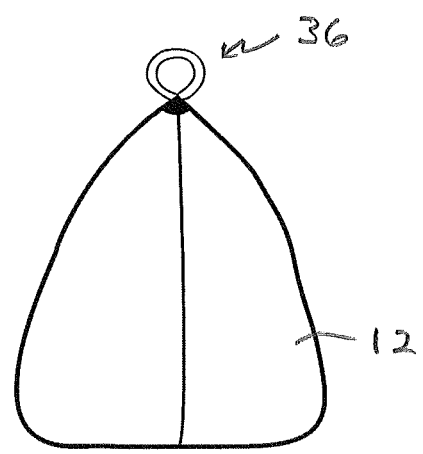
FIG. 17 illustrates an eyelet embedded into a bottom balanced limestone sinker body.

The eyelet is inserted into the 1/16" glued hole, twisted a quarter turn to the right and held in place. FIGS. 17, 17.1 and 17.2 illustrate a limestone sinker body with a fastener attached to the sinker body.

Figure 18:
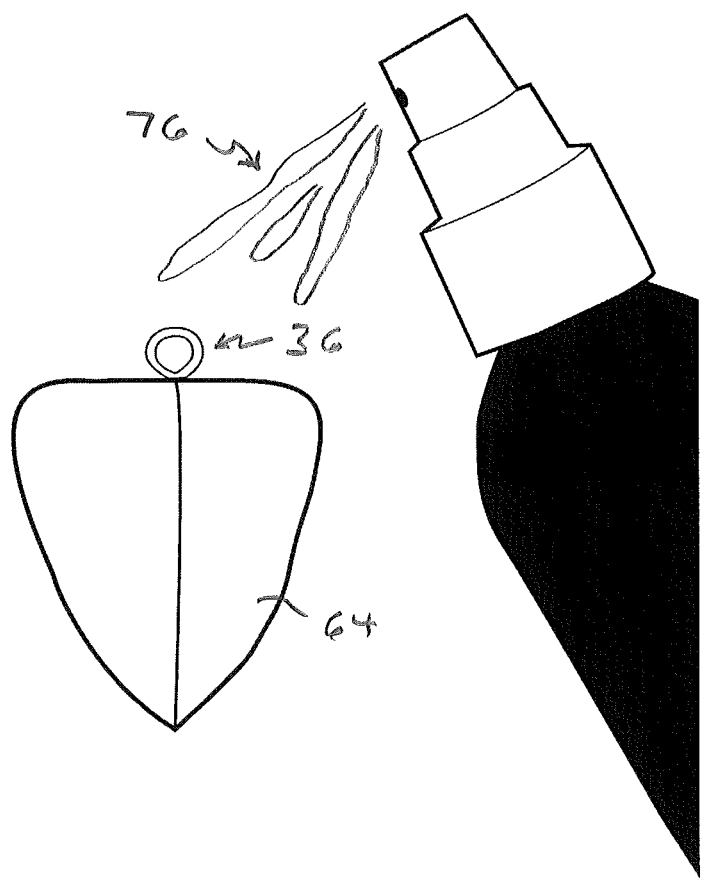
FIG. 18 illustrates the application of Setter H to glue and eyelet

The glue and eyelet is then sprayed with four to six pumps of the quick dry Setter H compound at a minimum distance of three inches. This prevents the force of the spray from disfiguring the glue. FIG. 18 illustrates the application of the Setter H 76 to the glue and eyelet or swivel. This is an important step because the glue on the limestone sinker body should have a symmetrical circular "black eye" encompassing the eyelet or swivel body to permit maximum adhesion to the swivel, eyelet and sinker body. It is important the swivel body and glue be sprayed with Setter H at the same time to insure smooth rotation of the swivel. For best results, the Setter H is used in a 120 milliliter bottle with a pump spray. The Setter H is manufactured by Aron Alpha, Industrial Krazy Glue Products and is labeled Type Setter H. The Setter H is a heptane based compound that completely cures the exposed surface of the glue within thirty seconds and gives the glue a hard exterior with a glossy finish. The limestone sinker is then washed with water and non-scented liquid soap to remove any Setter H that would be on the surface of the limestone sinker.

An optional scent may be added to coat the limestone sinker as the final step. The scent, such as salmon egg oil, may be applied by marinating, spraying or dipping the limestone sinker in order to coat the entire sinker body. The scent does not affect the chemical properties of the limestone sinker or its ability to produce alkalinity and raise pH.

Non-Lead Break-Away Swivel Placement for a Class II Sinker

The placement of a break-away swivel in a Class II limestone sinker will now be described. Class II sinkers can use a break-away swivel. First, when necessary, the sinkers are ground on a drill mark, with a semi-coarse grade rock grinder to create a small, smooth and level surface to allow for more efficient drilling. Class II sinkers can be drilled with a low speed, 620 RPM (or less) stationary drill press, in order to prevent chipping and cracking of the sinker.

In one example, Class II sinkers are drilled with a 5/64" carbide drill bit to a depth of approximately 1/4". It is desirable to use a carbide drill bit on the limestone sinker body in order to prevent cracking of the limestone and to make precision holes to the exact diameter. It is equally desirable to leave 17/64" of the drill bit out of the drill chuck because if too little of the drill bit is exposed, then the drilled hole will not be deep enough for the swivel or eyelet to fit; or if too much is exposed, the drill bit will break during the drilling process.

The limestone sinkers are drilled on a mark that intersects the center of gravity of the limestone. This is a mark where optimum balanced sinking weight is centered toward the bottom of the sinker. Since no two sinkers are identical, this mark is different on each limestone sinker. When drilling, it is desirable to hold the sinkers with rubber coated pliers, or grips, to prevent the sinkers from being nicked or scratched.

The sinkers are then cleaned of drilling dust by tapping, brushing, blowing, or rinsing with water. If rinsed with water, the sinker must be completely dry before gluing.

An optional rubber ring, with an inside diameter of 0.9 mm, an outside diameter of 2.2 mm and a thickness of 0.8 mm is placed on the stem of the swivel tight and flat against the bottom of the swivel body. FIGS. 4 and 5 are illustrations of rubber ring and rubber ring encompassing the stem of a swivel. It is important that the rubber ring be made as described above in order for the swivel body to rest balanced and level on the surface of the sinker body. The rubber ring also aids in the gluing process as an adjustment tool when adhering the swivel body to the sinker body.

The swivel is held in place by glue using the same glue and gluing technique described above. Then the glue can be sprayed with Setter H as described above. The limestone sinker is then washed with water and non-scented liquid soap to remove any Setter H that would be on the surface of the limestone sinker.

An optional scent may be added to coat the limestone sinker as the final step. The scent, such as salmon egg oil, may be applied by marinating, spraying or dipping the limestone sinker in order to coat the entire sinker body. The scent does not affect the chemical properties of the limestone sinker or its ability to produce alkalinity and raise pH.

Non-Lead Eyelet Placement

In another example, a non-lead eyelet can be used in Class I and Class II limestone sinkers. The eyelets are made of stainless steel material. The wire is cut and uniformly twisted to a length of approximately 8.73 mm First, when necessary, the sinkers are ground on a drill mark with a semi-coarse grade rock grinder to create a small, smooth and level surface to allow for more efficient drilling.

The Class I and Class II sinkers can be drilled with a low speed, 620 RPM (or less) stationary drill press, in order to prevent chipping and cracking of the sinker. The Class I and Class II sinkers can be drilled with a 1/16" carbide drill bit to a depth of approximately 1/4". It is desirable to use a carbide drill bit on the limestone sinker body in order to prevent cracking of the limestone and to make precision holes to the exact diameter. It is equally desirable to leave 17/64" of the drill bit out of the drill chuck because if too little of the drill bit is exposed, then the drilled hole will not be deep enough for the swivel or eyelet to fit; or if too much is exposed, the drill bit will break during the drilling process.

The limestone sinkers are drilled on a mark that intersects the center of gravity of the limestone. This is a mark where optimum balanced sinking weight is centered toward the bottom of the sinker. Since no two sinkers are identical, this mark is a different mark on each limestone sinker.

When drilling, it is desirable to hold the sinkers with rubber coated pliers, or grips, to prevent the sinkers from being nicked or scratched. The sinkers are then cleaned of drilling dust by tapping, brushing, blowing, or rinsing with water. If rinsed with water, the sinkers must be completely dry before gluing.

The swivel is held in place by glue using the same glue and gluing technique described above. Then the glue can be sprayed with Setter H as described above. The eyelet is then set in the 1/16" glued hole, twisted a quarter turn to the right, and held in place. It is important that the eyelet be turned to the right for the glue to adhere properly to the stern.

An optional scent may be added to coat the limestone sinker as the final step. The scent, such as salmon egg oil, may be applied by marinating, spraying or dipping the limestone sinker in order to coat the entire sinker body. The scent does not affect the chemical properties of the limestone sinker or its ability to produce alkalinity and raise pH.

Placement of a Non-Lead Eyelet in an In-Line Cylindrical Limestone Sinker

Figure 19:
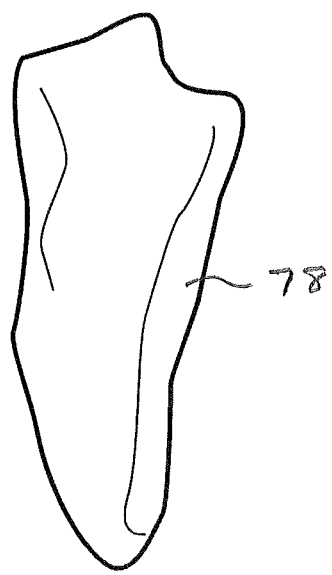
FIG. 19 is a schematic representation of an unprocessed limestone.
Figure 20:
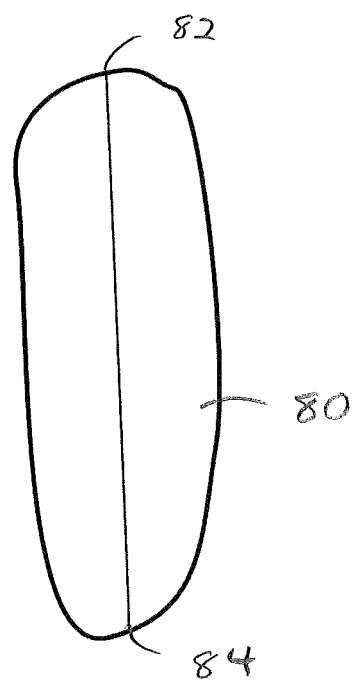
FIG. 20 is a schematic representation of a tumbled limestone.
Figure 21:
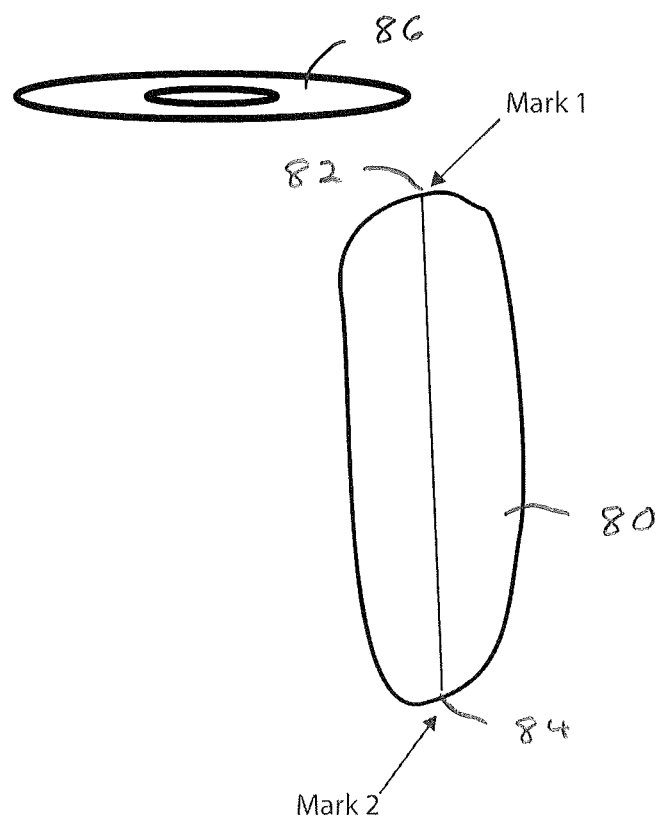
FIG. 21 illustrates a grinding process for a limestone sinker body.
Figure 22:
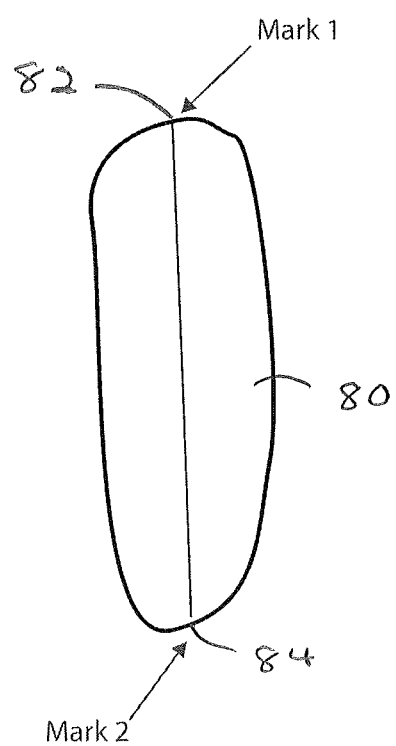
FIG. 22 illustrates the preferred drilling marks in a limestone sinker body.

Class I or Class II cylindrical shaped limestone fishing sinkers have a preferred minimum length of at least 1 inch. This minimum length helps to prevent chipping or cracking during drilling and allows for proper space and holding strength for the eyelet. The In-line Cylindrical Limestone Sinkers are manufactured with the stationary eyelets or break-away swivels on opposite ends. FIG. 19 is a schematic representation of an unprocessed limestone 78 for an in-line sinker. FIG. 20 is a schematic representation of a tumbled limestone body 80 for an in-line sinker In-line Class I sinkers include an eyelet. First, when necessary, the sinkers are ground on two separate drill marks 82 and 84 with a semi-coarse grade rock grinder to create a small, smooth and level surface to allow for more efficient drilling. FIG. 21 illustrates a grinding process for a limestone sinker body in which a grinding wheel 86 is used to grind the sinker body 80. FIG. 22 illustrates the preferred drilling marks in a limestone sinker body.

Class I sinkers can be drilled with a low speed, 620 RPM (or less) stationary drill press, in order to prevent chipping and cracking of the sinker. The Class I sinkers can be drilled with a 1/16" carbide drill bit to a depth of approximately 1/4". It is desirable to use a carbide drill bit on the limestone sinker body in order to prevent cracking of the limestone and to make precision holes to the exact diameter. It is equally desirable to leave 17/64" of the drill bit out of the drill chuck because if too little of the drill bit is exposed, then the drilled hole will not be deep enough for the swivel or eyelet to fit; or if too much is exposed, the drill bit will break during the drilling process.

The limestone sinker can be drilled on two different marks, which are positioned at the tips on the limestone or at positions that are the furthest distance apart from each mark on the sinker. This helps to create a streamline effect when fishing. When drilling, the sinkers may be held with rubber coated pliers, or grips, to prevent the sinkers from being nicked or scratched.

Figure 23:
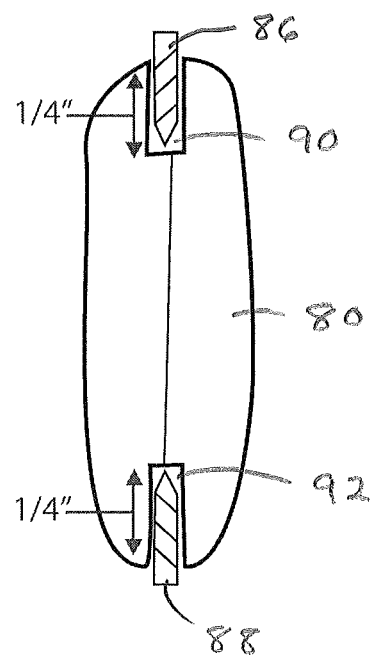
FIG. 23 illustrates a drilling process for a limestone sinker body.

FIG. 23 illustrates a drilling process for a limestone sinker body. Bits 86 and 88 are used to drill cavities 90 and 92 in the limestone body 80. The sinkers are then cleaned of drilling dust by tapping, brushing, blowing, or rinsing with water. If rinsed with water, the sinkers must be completely dry before gluing.

The eyelet is held in place by glue using the same glue and gluing technique described above. Then the glue can be sprayed with Setter H as described above.

Figure 24:
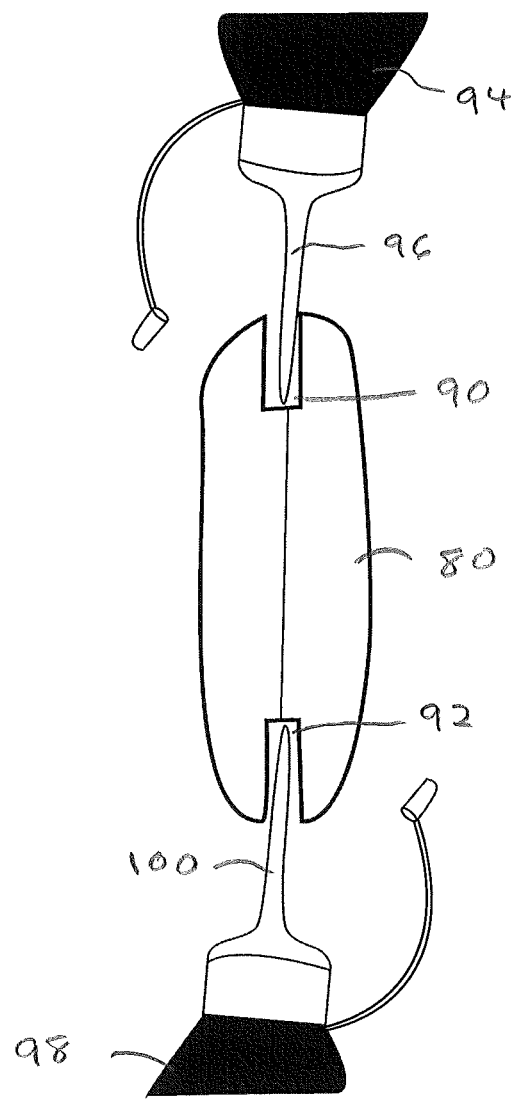
FIG. 24 illustrates the application of glue to a limestone sinker body.
Figure 25:
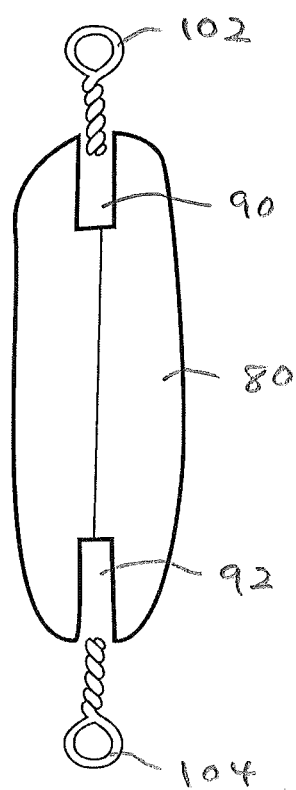
FIG. 25 illustrates the insertion of eyelets in a limestone sinker body.

FIG. 24 illustrates the application of glue to a limestone sinker body. A glue bottle 94 includes an applicator tip 96 and a glue bottle 98 includes an applicator tip 100. The first eyelet is set in the 1/16" glued hole, twisted a quarter turn to the right, and held in place. FIG. 25 illustrates the insertion of eyelets 102 and 104 into a sinker body.

Figure 27:
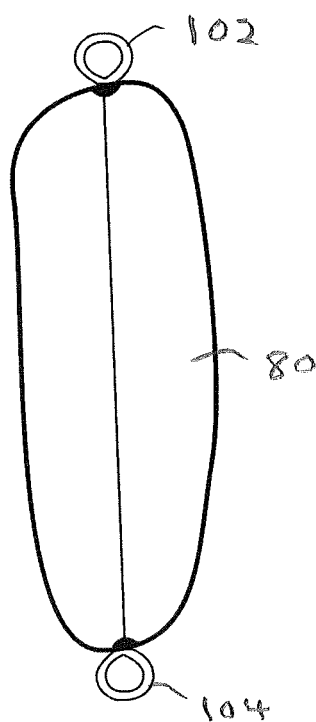
FIG. 27 illustrates eyelets attached to the farthest ends of a limestone sinker body.

Then, glue is added into the second 1/16" drilled hole in the limestone sinker. The second eyelet is then set in the 1/16" glued hole, twisted a quarter turn, and held in place. The glue and second eyelet are then sprayed with the quick dry Setter H compound. It is important that the second eyelet be symmetrical, and that the eyelet is turned to match, or face, the same direction as the first eyelet. FIG. 27 illustrates eyelets attached to the farthest ends of the limestone sinker body. The limestone sinker is then washed with water and non-scented liquid soap to remove any Setter H that would be on the surface of the limestone sinker.

An optional scent may be added to coat the limestone sinker as the final step. The scent, such as salmon egg oil, may be applied by marinating, spraying or dipping the limestone sinker in order to coat the entire sinker body. The scent does not affect the chemical properties of the limestone sinker or its ability to produce alkalinity and raise pH.

Placement of Swivels in a Class II In-Line Sinker

Class II sinkers use break-away swivel. First, when necessary, the sinkers are ground on a drill mark with a semi-coarse grade rock grinder to create a small, smooth and level surface to allow for more efficient drilling. FIG. 21 illustrates a grinding process for a limestone sinker body. FIG. 22 illustrates the preferred drilling marks in a limestone sinker body.

Class II sinkers can be drilled with a low speed, 620 RPM stationary drill press, in order to prevent chipping and cracking of the sinker. Class II sinkers can be drilled with a 5/64" carbide drill bit to a depth of approximately 1/4". It is desirable to use a carbide drill bit on the limestone sinker body in order to prevent cracking of the limestone and to make precision holes to the exact diameter. It is equally desirable to leave 17/64" of the drill bit out of the drill chuck because if too little of the drill bit is exposed, then the drilled hole will not be deep enough for the swivel or eyelet to fit; or if too much is exposed, the drill bit will break during the drilling process.

The limestone sinker can be drilled on two separate marks, each mark being at a tip of the sinker, or at positions which are the furthest distance apart from each mark. This helps to create a streamline effect when fishing. When drilling, the sinkers can be held with rubber coated pliers, or grips, to prevent the sinkers from being nicked or scratched.

FIG. 23 illustrates a drilling process for a limestone sinker body. The sinkers are then cleaned of drilling dust by tapping, brushing, blowing, or rinsing with water. If rinsed with water, the sinkers must be completely dry before gluing.

The eyelet is held in place by glue using the same glue and gluing technique described above. Then the glue can be sprayed with Setter H as described above. FIG. 24 illustrates the application of glue to a limestone sinker body.

Figure 26:
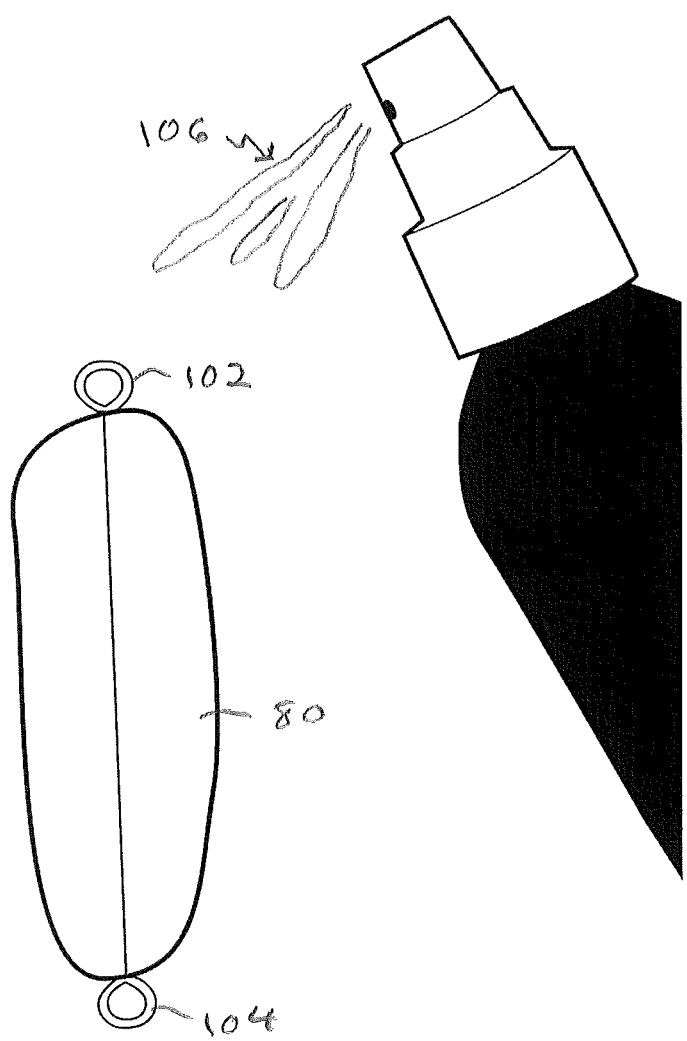
FIG. 26 illustrates the application of Setter H to glue and eyelet.

The swivel is then set in the 5/64" glued hole. When inserting the swivel stem into the drilled hole it is desirable to make a circular motion with the stem. This is done to prevent glue from escaping out the top of the drilled hole. The bottom stem of the swivel body is also moved in a circular motion until it rest level on the surface of the limestone sinker body and remains in place. FIG. 25 illustrates the insertion of an eyelet into a sinker body. FIG. 26 illustrates the application of the Setter H to the glue and eyelet or swivel.

The limestone sinker is then washed with water and non-scented liquid soap to remove any Setter H that would be on the surface of the limestone sinker. Then, glue is added into the second 5/64" drilled hole in the limestone sinker. The second swivel is then set in the 5/64" glued hole. When inserting the swivel stem into the drilled hole it is important to make a circular motion with the stem. This is done to prevent glue from escaping out the top of the drilled hole. The bottom of the swivel body is also moved in a circular motion until it rest level on the surface of the limestone sinker body and remains in place. The second glue and swivel is then sprayed with the quick dry Setter H compound. It does not matter if the swivels are symmetrical since they rotate. FIG. 27 illustrates eyelets attached to the farthest ends of the limestone sinker body.

The limestone sinker is then washed with water and non-scented liquid soap to remove any Setter H that would be on the surface of the limestone sinker. An optional scent may be added to coat the limestone sinker as the final step. The scent, such as salmon egg oil, may be applied by marinating, spraying or dipping the limestone sinker in order to coat the entire sinker body. The scent does not affect the chemical properties of the limestone sinker or its ability to produce alkalinity and raise pH.

Placement of Eyelets in the Class I and Class II In-Line Sinkers

The eyelets are made of stainless steel. The wire is cut and uniformly twisted to a length of approximately 8.73 mm. First, when necessary, the sinkers are ground on two separate drill marks with a semi-coarse grade rock grinder to create a small, smooth and level surface to allow for more efficient drilling. FIG. 21 illustrates a grinding process for a limestone sinker body. FIG. 22 illustrates the preferred drilling marks in a limestone sinker body.

The Class I and Class II sinkers can be drilled with a low speed, 620 RPM (or less) stationary drill press, in order to prevent chipping and cracking of the sinker. The Class I and Class II sinkers can be drilled with a 1/16" carbide drill bit to a depth of approximately 1/4". It is desirable to use a carbide drill bit on the limestone sinker body in order to prevent cracking of the limestone and to make precision holes to the exact diameter. It is equally desirable to leave 17/64" of the drill bit out of the drill chuck because if too little of the drill bit is exposed, then the drilled hole will not be deep enough for the swivel or eyelet to fit; or if too much is exposed, the drill bit will break during the drilling process. FIG. 23 illustrates a drilling process for a limestone sinker body.

The limestone sinker can be drilled on two separate marks. The marks can be at tip ends or at positions that are the furthest distance from the other mark. This helps to create a streamline affect when fishing. When drilling, the sinkers may be held with rubber coated pliers, or grips, to prevent the sinkers from being nicked or scratched. The sinkers are then cleaned of drilling dust by tapping, brushing, blowing, or rinsing with water. If rinsed with water, the sinkers must be completely dry before gluing.

The eyelet is held in place by glue using the same glue and gluing technique described above. Then the glue can be sprayed with Setter H as described above. FIG. 24 illustrates the application of glue to a limestone sinker body. The first eyelet is set in the 1/16" glued hole, twisted a quarter turn, and held in place. FIG. 25 illustrates the insertion of an eyelet into a sinker body.

The limestone sinker is then washed with water and non-scented liquid soap to remove any Setter H that would be on the surface of the limestone sinker. Then, glue is added into the second 1/16" drilled hole in the limestone sinker. The second eyelet is then set in the 1/16" glued hole, twisted a quarter turn and held in place. The glue and second eyelet are then sprayed with the quick dry Setter H compound. It is important that the second eyelet be symmetrical, and that the eyelet is turned to match, or face the same direction as the first eyelet. FIG. 27 illustrates eyelets attached to the farthest ends of the limestone sinker body.

The limestone sinker is then washed with water and non-scented liquid soap to remove any Setter H that would be on the surface of the limestone sinker. An optional scent may be added to coat the limestone sinker as the final step. The scent, such as salmon egg oil, may be applied by marinating, spraying or dipping the limestone sinker in order to coat the entire sinker body. The scent does not affect the chemical properties of the limestone sinker or its ability to produce alkalinity and raise pH.

Non-Lead, Drop Shot Swivel Placement for a Class II Sinker

The placement of a Drop Shot Swivel in a Class II limestone sinker will now be described. Class II sinkers use a drop shot swivel. First, when necessary, the sinkers are ground on a drill mark, with a semi-coarse grade rock grinder to create a small, smooth and level surface to allow for more efficient drilling. FIG. 11 illustrates a grinding process for a limestone sinker body.

Class II sinkers can be drilled with a low speed, 620 RPM (or less) stationary drill press, in order to prevent chipping and cracking of the sinker. In one example, Class II sinkers are drilled with a 5/64" carbide drill bit to a depth of approximately 1/4". It is desirable to use a carbide drill bit on the limestone sinker body in order to prevent cracking of the limestone and to make precision holes to the exact diameter. It is equally desirable to leave 17/64" of the drill bit out of the drill chuck because if too little of the drill bit is exposed, then the drilled hole will not be deep enough for the swivel or eyelet to fit; or if too much is exposed, the drill bit will break, during the drilling process.

FIG. 14 illustrates a drilling process for a limestone sinker body. The limestone sinkers are drilled on a mark that intersects the center of gravity of the limestone. This is a mark where optimum balanced sinking weight is centered toward the bottom of the sinker. Since no two sinkers are identical, this mark is different on each limestone sinker.

When drilling, the sinkers may be held with rubber coated pliers, or grips, to prevent the sinkers from being nicked or scratched. The sinkers are then cleaned of drilling dust by tapping, brushing, blowing, or rinsing with water. If rinsed with water, the sinker must be completely dry before gluing.

Figure 28:
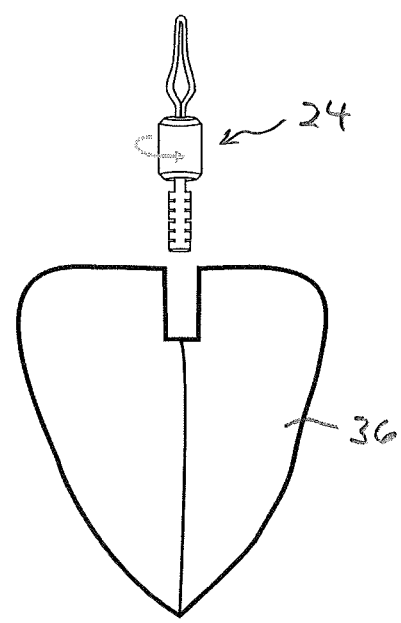
FIG. 28 illustrates the insertion of a drop shot swivel.
Figure 29:
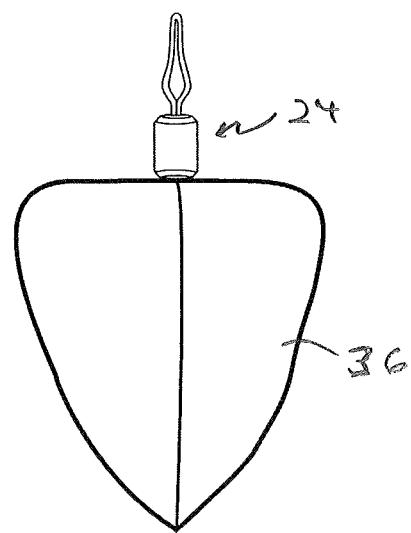
FIG. 29 illustrates the attachment of a drop shot swivel.

The swivel is held in place by glue using the same glue and gluing technique described above. Then the glue can be sprayed with Setter H as described above. FIG. 28 illustrates the insertion of a drop shot swivel 24 into a limestone sinker body 36. FIG. 29 illustrates the sinker following insertion of a drop shot swivel 24 into a limestone sinker body 36.

The limestone sinker is then washed with water and non-scented liquid soap to remove any Setter H that would be on the surface of the limestone sinker. An optional scent may be added to coat the limestone sinker as the final step. The scent, such as salmon egg oil, may be applied by marinating, spraying or dipping the limestone sinker in order to coat the entire sinker body. The scent does not affect the chemical properties of the limestone sinker or its ability to produce alkalinity and raise pH.

Non-Lead Tongue and Groove Fastener Placement

In another example, a tongue and groove fastener can be used in Class I and Class II limestone sinkers. First, when necessary, the sinkers are ground on a drill mark with a semi-coarse grade rock grinder to create a small, smooth and level surface to allow for more efficient drilling. FIG. 11 illustrates a grinding process for a limestone sinker body.

The Class I and Class II sinkers can be drilled with a low speed, 620 RPM (or less) stationary drill press, in order to prevent chipping and cracking of the sinker. The Class I sinkers can be drilled with a 1/16" carbide drill bit to a depth of approximately 1/4". The Class II sinkers can be drilled with a 5/64" carbide drill bit to a depth of approximately 1/4". It is desirable to use a carbide drill bit on the limestone sinker body in order to prevent cracking of the limestone and to make precision holes to the exact diameter. It is equally desirable to leave 17/64" of the drill bit out of the drill chuck because if too little of the drill bit is exposed, then the drilled hole will not be deep enough for the swivel or eyelet to fit; or if too much is exposed, the drill bit will break during the drilling process. FIG. 14 illustrates a drilling process for a limestone sinker body.

The limestone sinkers are drilled on a mark that intersects the center of gravity of the limestone. This is a mark where optimum balanced sinking weight is centered toward the bottom of the sinker. Since no two sinkers are identical, this mark is different on each limestone sinker. When drilling, the sinkers may be held with rubber coated pliers, or grips, to prevent the sinkers from being nicked or scratched. The sinkers are then cleaned of drilling dust by tapping, brushing, blowing, or rinsing with water. If rinsed with water, the sinkers must be completely dry before gluing.

Figure 30:
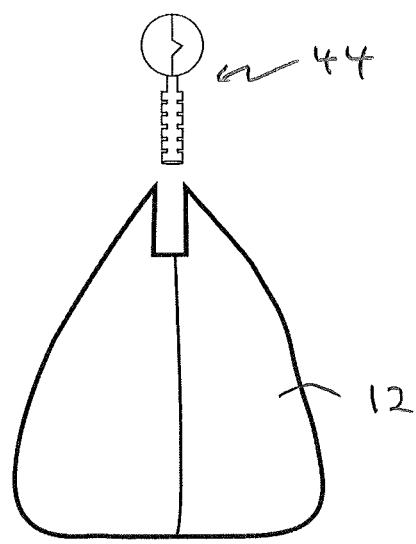
FIG. 30 illustrates the insertion of a tongue and groove fastener in a limestone sinker body.
Figure 31:
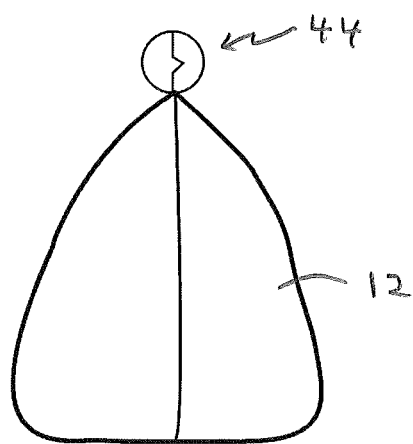
FIG. 31 illustrates a tongue and groove fastener attached to a limestone sinker body.

The tongue and groove fastener is held in place by glue using the same glue and gluing technique described above. Then the glue can be sprayed with Setter H as described above. The stem of the tongue and groove fastener is then set in the drilled hole, twisted a quarter turn, and held in place. FIG. 30 illustrates the insertion of a tongue and groove fastener 44 in a limestone sinker body 12. FIG. 31 illustrates a limestone sinker body with a tongue and groove fastener 44 attached to the sinker body 12.

The limestone sinker is then washed with water and non-scented liquid soap to remove any Setter H that would be on the surface of the limestone sinker. An optional scent may be added to coat the limestone sinker as the final step. The scent, such as salmon egg oil, may be applied by marinating, spraying or dipping the limestone sinker in order to coat the entire sinker body. The scent does not affect the chemical properties of the limestone sinker or its ability to produce alkalinity and raise pH.

Placement of Tongue and Groove Fasteners in the Class I and Class II In-Line Sinkers First, when necessary, the sinkers are ground on two separate drill marks, with a semi-coarse grade rock grinder to create a small, smooth and level surface to allow for more efficient drilling. FIG. 22 illustrates preferred drilling marks in a limestone sinker body.

The Class I and Class II sinkers can be drilled with a low speed, 620 RPM (or less) stationary drill press, in order to prevent chipping and cracking of the sinker. The Class I and Class II sinkers can be drilled with a 1/16" carbide drill bit to a depth of approximately 1/4". It is desirable to use a carbide drill bit on the limestone sinker body in order to prevent cracking of the limestone and to make precision holes to the exact diameter. It is equally desirable to leave 17/64" of the drill bit out of the drill chuck because if too little of the drill bit is exposed, then the drilled hole will not be deep enough for the swivel or eyelet to fit; or if too much is exposed, the drill bit will break during the drilling process. FIG. 23 illustrates a drilling process for a limestone sinker body.

The limestone sinker can be drilled on two separate marks. The marks can be at tip ends or at positions that are the furthest distance from the other mark. This helps to create a streamline effect when fishing. When drilling, the sinkers may be held with rubber coated pliers, or grips, to prevent the sinkers from being nicked or scratched. The sinkers are then cleaned of drilling dust by tapping, brushing, blowing, or rinsing with water. If rinsed with water, the sinkers must be completely dry before gluing.

The tongue and groove fastener is held in place by glue using the same glue and gluing technique described above. Then the glue can be sprayed with Setter H as described above. FIG. 24 illustrates the application of glue to a limestone sinker body. The stem of the first tongue and groove fastener is set in the 1/16" glued hole, twisted a quarter turn, and held in place.

The limestone sinker is then washed with water and non-scented liquid soap to remove any Setter H that would be on the surface of the limestone sinker. Then, glue is added into the second 1/16" drilled hole in the limestone sinker. The stem of the second tongue and groove fastener is then set in the 1/16" glued hole and twisted a quarter turn and held in place. The glue and second eyelet are then sprayed with the quick dry Setter H compound. It is important that the second tongue and groove fastener be symmetrical, and that the opening of the tongue and groove fastener is turned to match, or face the same direction as the opening of the first tongue and groove fastener.

The limestone sinker is then washed with water and non-scented liquid soap to remove any Setter H that would be on the surface of the limestone sinker. An optional scent may be added to coat the limestone sinker as the final step. The scent, such as salmon egg oil, may be applied by marinating, spraying or dipping the limestone sinker in order to coat the entire sinker body. The scent does not affect the chemical properties of the limestone sinker or its ability to produce alkalinity and raise pH.

Bored Hole Sinkers

In another aspect, the invention encompasses bored hole limestone sinkers, wherein holes are bored and pass through the sinker from front to back. The limestone sinkers are drilled on a mark that intersects the center of gravity of the limestone. This is a mark where optimum balanced sinking weight is centered toward the bottom of the sinker. This is a different mark on each limestone sinker, since no two sinkers are identical.

In the case of the in-line limestone sinker, holes are bored and pass through the sinker on marks at each farthest end of the sinker to provide a streamlined effect, particularly useful in casting. The bored holes provide a means for attaching the limestone sinker directly to a fishing line, without the use of a break-away swivel or eyelet. The bored hole can be attached to the fishing line by using a simple fishermen's line loop that allows optional efficient positioning on the fishing line. The bored hole sinker may also be attached by a snap tied directly on the fishing line. By using a bored hole, all man made sinker accessories, such as swivels or eyelets are kept out of waterways.

Fabrication of Class I and Class II Transverse Bored Hole Sinkers

Figure 32:
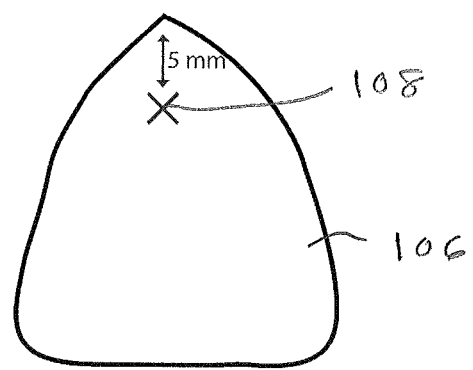
FIG. 32 illustrates the preferred drilling mark for a bored hole sinker body.

Class I and Class II bored hole sinkers can be drilled with a low speed, 620 RPM (or less) stationary drill press, using a 1/16" carbide drill bit. This is to prevent chipping and cracking of the sinker. FIG. 32 illustrates the preferred drilling mark 108 for a bored hole limestone sinker body 106.

The limestone body of the sinker can be drilled so that a hole is bored to pass through the sinker from front to back. The limestone sinkers are drilled on a mark that intersects the center of gravity of the limestone. This is a mark where optimum balanced sinking weight is centered toward the bottom of the sinker. Since no two sinkers are identical, this mark is different on each limestone sinker. The drilling mark should be at least 5 mm from the end of the sinker body toward the center of the sinker body.

Figure 33:
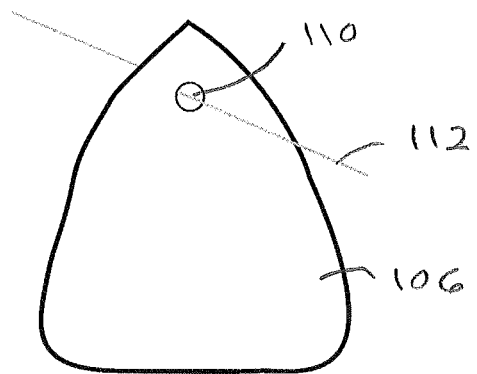
FIG. 33 illustrates a bored hole limestone sinker body.

When drilling, the sinkers may be held with rubber coated pliers, or grips, to prevent the sinkers from being nicked or scratched. It is desirable to use a carbide drill bit on the limestone sinker body in order to prevent cracking of the limestone and to make precision holes to the exact diameter. FIG. 33 illustrates a bored hole limestone sinker body 106, with an opening 110 for receiving a fishing line 112.

The sinkers are then cleaned of drilling dust by tapping, brushing, blowing, or rinsing with water. An optional scent may be added to coat the limestone sinker as the final step. The scent, such as salmon egg oil, may be applied by marinating, spraying or dipping the limestone sinker in order to coat the entire sinker body. The scent does not affect the chemical properties of the limestone sinker or its ability to produce alkalinity and raise pH.

Fabrication of Class I and Class II Transverse Bored Hole In-Line Sinkers

Class I and Class II bored hole sinkers can be drilled with a low speed, 620 RPM (or less) stationary drill press, using a 1/16" carbide drill bit. This is to prevent chipping and cracking of the sinker.

The limestone sinker can be drilled, so that a hole is bored to pass longitudinally through the sinker, passing through two separate marks. Each mark can be adjacent to an end, but not at the tips of the sinker. The marks can be located at the longest distance from each other. This helps to create a streamlined effect when fishing. The drilling marks should be at least 5 mm from the end of the sinker body toward the center of the sinker body.

Figure 34:
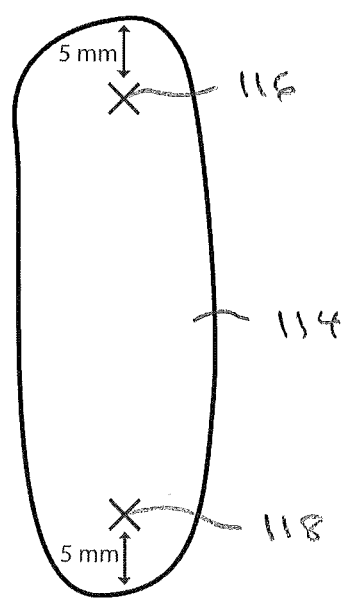
FIG. 34 illustrates the preferred drilling marks for another bored hole limestone sinker body.
Figure 35:
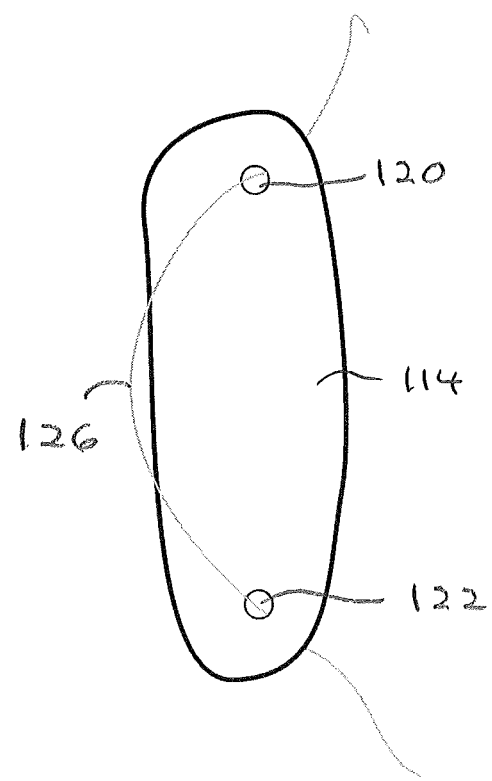
FIG. 35 illustrates another bored hole limestone sinker body.

FIG. 34 illustrates the preferred drilling marks for another bored hole limestone sinker body 114 with drilling marks 116 and 118. When drilling, the sinkers may be held with rubber coated pliers, or grips, to prevent the sinkers from being nicked or scratched. It is desirable to use a carbide drill bit on the limestone sinker body in order to prevent cracking of the limestone and to make precision holes to the exact diameter. FIG. 35 illustrates a bored hole limestone sinker body 114 with openings 120 and 122 for receiving a fishing line 126.

The sinkers are then cleaned of drilling dust by tapping, brushing, blowing, or rinsing with water. An optional scent may be added to coat the limestone sinker as the final step. The scent, such as salmon egg oil, may be applied by marinating, spraying or dipping the limestone sinker in order to coat the entire sinker body. The scent does not affect the chemical properties of the limestone sinker or its ability to produce alkalinity and raise pH.

The invention has been described with considerable detail, illustrating the preferred embodiments of the invention in order for it to provide optimal performance in its field. It is understood that the intention of the present invention is to be used as a fishing sinker that reduces the dangers of pollution or toxicity to humans, aquatic life, wildlife, surrounding ecosystems or environment; while providing a composition capable of producing alkalinity and raising pH in waterways.

The limestone sinkers of this invention are not an ordinary natural stone sinker. The limestone is processed to a unique shape, size, texture, appearance, and optional scent that is not able to be found anywhere in the natural environment. For example, some anglers prefer a fragrance to attract fish to bait. A fragrance such as, salmon egg oil or cheese scent, may be added by marinating, spraying or dipping the limestone sinker in the scent in order to coat the entire sinker body.

The limestone sinkers can raise the pH levels and produce alkalinity in waterways. An example of waterways with low pH and alkalinity levels include waterways that are/or have been polluted by acid mine drainage.

One or two non-leaded break-away swivels, eyelets, or tongue and groove fasteners can be embedded into the limestone sinker on a mark, or marks, which provide optimal performance. The break-away swivels, eyelets, drop shot swivels and tongue and groove fasteners serve as an efficient means for attaching the sinker onto a fishing line.

Sinkers of this invention are harder to snag and easier to get unattached when snagged by protrusions in waterways. No two of these sinkers are alike in shape, size, appearance, and texture. This provides a way for the angler to select each limestone sinker as he/she would select a fly, lure, jig, spinner, bait, etc. Limestone sinkers may be selected according to the conditions of the waterway, weather, ecosystem, environment, etc. The selection depends on what limestone sinkers will perform best according to the conditions.

The sinkers are processed to a shape, size, and texture that allow them to sink less rapidly than most other sinkers on the market. This provides a natural appearance and uninhibited natural movement to lures, flies, jigs, spinners, baits, etc. By uninhibited, this means there is no effort given by the angler to provide movement to the lure, fly, jig, spinner, bait, etc. This unique ability enables it to perform very well for drift or float fishing maneuvers.

Following processing, the limestone is odorless. Most other sinkers on the market possess an odor, depending on the material they are composed of, which may deter fish from bait. The fact that the limestone sinker has no odor gives it a more natural pretense in waterways, which is less likely to daunt fish.

Sinkers constructed in accordance with this invention possess the chemical properties to benefit waterways with low pH and alkalinity levels. The limestone sinker can be attached directly to a fishing line by means of a break-away swivel or eyelet that is embedded in the sinker, or by means of a hole that is bored to pass through the sinker. By attaching the limestone sinker directly to the line, with an eyelet, break-away swivel, drop shot swivel, tongue and groove fastener, or bored hole, the angler has the ease of positioning the sinker on the desired mark of the fishing line. The limestone sinker is also easily attachable by means of snapping the eyelet or swivel onto a swivel snap tied directly onto the fishing line. This provides the angler with a way to maintain a stationary position for the limestone sinker.

While the invention has been described in terms of several embodiments, it will be apparent to those skilled in the art that various changes can be made to the described embodiments without departing from the scope of the invention as set forth in the following claims.

What is claimed is:
1. A fishing sinker comprising:
a natural limestone body;

a swivel fastener including a stem positioned in a cavity of the limestone body, an eyelet, and a swivel body coupling the stem to the eyelet; and a resilient ring positioned on the stem between the swivel body and the limestone body, and against the swivel body.

2. The fishing sinker of claim 1, wherein the stem includes a plurality of circumferential ridges.

3. The fishing sinker of claim 1, wherein the stem is secured in the cavity in the limestone body using glue.

4. The fishing sinker of claim 3, wherein the glue is coated with a setting compound.

5. The fishing sinker of claim 3, wherein the glue forms a circular black eye encompassing the stem.

6. The fishing sinker of claim 1, wherein the cavity is a cylindrical cavity positioned along a line passing through a center of gravity of the body.

7. The fishing sinker of claim 1, wherein the swivel fastener has a pull strength in a range of from about 4 pounds to about 300 pounds.

8. The fishing sinker of claim 1, further comprising a scented coating on the limestone body.

9. The fishing sinker of claim 8, wherein the scented coating includes a salmon egg oil or cheese scent.

10. The fishing sinker of claim 8, wherein the scented coating is applied by marinating, spraying or dipping the limestone body.

11. The fishing sinker of claim 1, wherein the body includes a substantially flat surface and wherein the cavity is positioned in the flat surface and lies along a line that intersects a center of gravity of the body.

12. A fishing sinker comprising:
a natural limestone body; and
a break-away swivel fastener including a stem in a cavity of the limestone body, an eyelet, and a swivel body coupling the stem to the eyelet;
wherein the eyelet comprises a diamond shaped portion with cutters positioned on inside edges of an apex of the diamond shaped portion.

13. A fishing sinker comprising:
a natural limestone body;
a swivel fastener including a stem positioned in a cavity of the limestone body, an eyelet, and a swivel body coupling the stem to the eyelet; and
a resilient ring positioned on the stem between the swivel body and the limestone body, wherein the resilient ring comprises a rubber washer.

14. A fishing sinker comprising:
a natural limestone body; and
a break-away swivel fastener including a stem in a cavity of the limestone body, an eyelet, and a swivel body coupling the stem to the eyelet;
wherein the eyelet comprises a diamond shaped portion with cutters positioned on inside edges of an apex of the diamond shaped portion.

\* \* \* \* \*